US009890899B2

United States Patent
Theis et al.

(10) Patent No.: US 9,890,899 B2
(45) Date of Patent: Feb. 13, 2018

(54) PORTABLE ELECTRONIC DEVICE MOUNTING SYSTEMS AND METHODS

(71) Applicant: Ergotron, Inc., St. Paul, MN (US)

(72) Inventors: John William Theis, St. Paul, MN (US); Shaun Christopher Lindblad, Lino Lakes, MN (US); Robert William Fluhrer, Prior Lake, MN (US); Mustafa A. Ergun, Plymouth, MN (US)

(73) Assignee: Ergotron, Inc., St. Paul, MN (US)

( * ) Notice: Subject to any disclaimer, the term of this patent is extended or adjusted under 35 U.S.C. 154(b) by 0 days.

(21) Appl. No.: 15/165,815

(22) Filed: May 26, 2016

(65) Prior Publication Data

US 2017/0009935 A1    Jan. 12, 2017

Related U.S. Application Data

(60) Provisional application No. 62/189,471, filed on Jul. 7, 2015.

(51) Int. Cl.
*F16M 13/02* (2006.01)
*F16M 11/04* (2006.01)
(Continued)

(52) U.S. Cl.
CPC ........... *F16M 13/022* (2013.01); *A47B 23/04* (2013.01); *F16M 11/04* (2013.01);
(Continued)

(58) Field of Classification Search
CPC .. F16M 13/022; F16M 11/04; F16M 11/2064; F16M 2200/038; F16M 11/041;
(Continued)

(56) References Cited

U.S. PATENT DOCUMENTS 7,032,872 B2 *   4/2006   Sullivan ................. F16M 11/22
                                                              248/346.06
7,174,752 B2     2/2007   Galant
(Continued)

FOREIGN PATENT DOCUMENTS

CN        104071083 A      10/2014
EP          2843288 A1      3/2015
(Continued)

OTHER PUBLICATIONS

"iPad Mini Tablet PC Car Holder / Desk Stand Holder 60 Rotating Foldable Mount", [Online]. Retrieved from the Internet: <URL: http://www.car-mountholder.com/sale-2044697-ipad-mini-tablet-pc-car-holder-desk-stand, (Accessed Jan. 23, 2015), 4 pgs.
(Continued)

*Primary Examiner* — Tan Le
(74) *Attorney, Agent, or Firm* — Schwegman Lundberg & Woessner, P.A.

(57) ABSTRACT

An apparatus to hold an electronic device includes a housing assembly including a housing body; a first arm configured to extend from a first end of the body; a first hook and a second hook engaged to and extending from a first end region of the first arm, a portion of the first hook and a portion of the second hook extending toward the body, the first hook and the second hook forming a first hook pair to receive the device; a second arm configured to extend from a second end of the body; and a third hook and a fourth hook engaged to and extending from a first end region of the second arm, a portion of the third hook and a portion of the fourth hook extending toward the housing body, the third hook and the fourth hook forming a second hook pair to receive the device.

22 Claims, 23 Drawing Sheets

(51) Int. Cl.
*E05B 73/00* (2006.01)
*G06F 1/16* (2006.01)
*F16M 11/20* (2006.01)
*A47B 23/04* (2006.01)
*A47B 97/00* (2006.01)

(52) U.S. Cl.
CPC ....... *F16M 11/041* (2013.01); *F16M 11/2064* (2013.01); *F16M 13/02* (2013.01); *A45F 2200/0525* (2013.01); *A47B 2097/006* (2013.01); *F16M 2200/028* (2013.01)

(58) Field of Classification Search
CPC ........ F16M 11/10; F16M 13/00; A47B 23/04; A47B 2097/006; A45F 2200/0525
USPC ............... 248/122.1, 12, 346.06, 274.1, 551, 248/231.51, 316.1, 448, 451, 553; 361/679.55, 679.56, 679.58, 807, 825
See application file for complete search history.

(56) References Cited

U.S. PATENT DOCUMENTS

| | | | |
|---|---|---|---|
| D630,222 S | 1/2011 | Lin | |
| 8,235,334 B1 | 8/2012 | Kobal | |
| 8,240,628 B2 * | 8/2012 | Huang | F16M 11/041 248/122.1 |
| D673,960 S | 1/2013 | Lindfield et al. | |
| 8,413,943 B1 | 4/2013 | Li | |
| D684,980 S | 6/2013 | Chun | |
| 8,469,325 B2 * | 6/2013 | Yu | G10G 5/005 248/231.51 |
| D685,379 S | 7/2013 | Richter | |
| D685,804 S | 7/2013 | Richter | |
| 8,702,055 B2 | 4/2014 | Alemozafar et al. | |
| 8,711,553 B2 | 4/2014 | Trinh | |
| 8,833,716 B2 | 9/2014 | Funk et al. | |
| 8,864,089 B2 * | 10/2014 | Hung | F16M 11/041 248/122.1 |
| D717,307 S | 11/2014 | Chun | |
| D717,804 S | 11/2014 | Budge | |
| D723,042 S | 2/2015 | Lee et al. | |
| 9,103,492 B2 * | 8/2015 | Springer | F16M 11/041 |
| D741,146 S | 10/2015 | Delrue et al. | |
| D742,387 S | 11/2015 | Xiang et al. | |
| 9,285,832 B2 * | 3/2016 | Galant | F16M 11/105 |
| D753,126 S | 4/2016 | Alesi et al. | |
| D765,646 S | 9/2016 | Deng et al. | |
| D766,908 S | 9/2016 | Richter | |
| 2009/0219677 A1 | 9/2009 | Mori | |
| 2010/0327129 A1 | 12/2010 | Chen | |
| 2013/0009032 A1 | 1/2013 | Polletta et al. | |
| 2013/0026324 A1 | 1/2013 | Fischer et al. | |
| 2013/0092805 A1 | 4/2013 | Funk et al. | |
| 2013/0213838 A1 | 8/2013 | Tsai et al. | |
| 2014/0246551 A1 | 9/2014 | Springer et al. | |
| 2014/0263931 A1 | 9/2014 | Chen | |

FOREIGN PATENT DOCUMENTS

| | | |
|---|---|---|
| WO | WO-2012137007 A1 | 10/2012 |
| WO | WO-2013020234 A1 | 2/2013 |
| WO | WO-2015026918 A1 | 2/2015 |
| WO | WO-2017007537 A1 | 1/2017 |

OTHER PUBLICATIONS

"Tablet Stand Detail Display with Speaker", Loctek, (Mar. 27, 2015), 1 pg.

"Traveler iPAD Tablet Stand", Lapworks, [Online]. Retrieved from the Internet: <URL: http://www.laptopdesk.net/traveler-tablet-stand.html, (Accessed Jan. 23, 2015), 7 pgs.

"International Application Serial No. PCT/US2016/034386, International Search Report dated Aug. 12, 2016", 5 pgs.

"International Application Serial No. PCT/US2016/034386, Written Opinion dated Aug. 12, 2016", 6 pgs.

"U.S. Appl. No. 29/541,540, Notice of Allowance dated Aug. 9, 2017", 7 pgs.

"U.S. Appl. No. 29/541,540, Response filed Jul. 27, 2017 to Restriction Requirement dated Jun. 7, 2017", 3 pgs.

"U.S. Appl. No. 29/541,540, Restriction Requirement dated Jun. 7, 2017", 7 pgs.

* cited by examiner

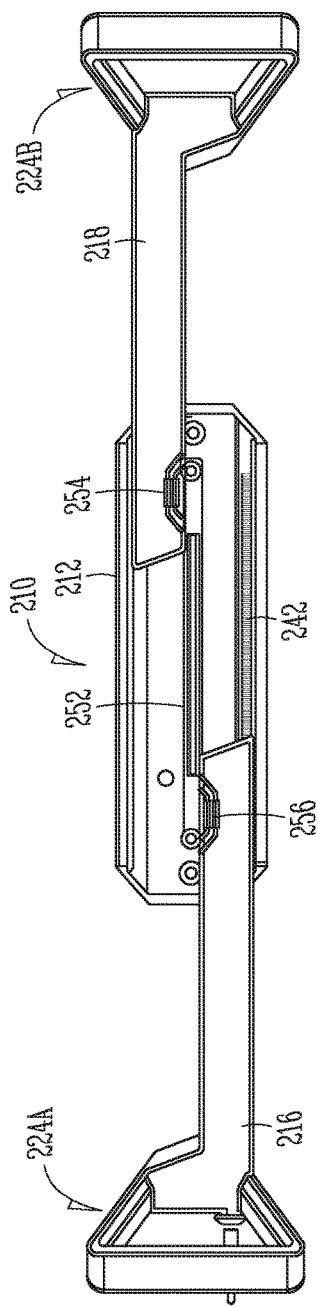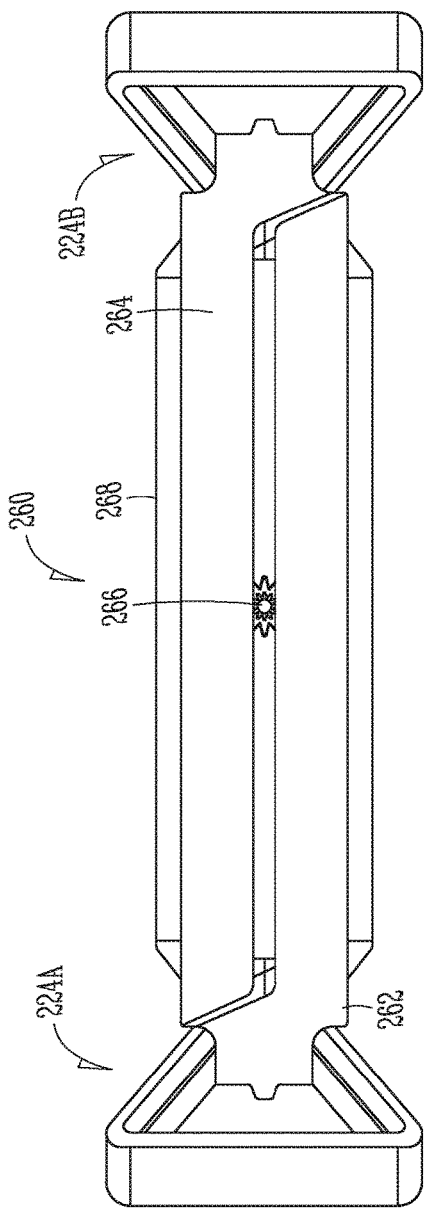

PORTABLE ELECTRONIC DEVICE MOUNTING SYSTEMS AND METHODS

CLAIM OF PRIORITY

This patent application claims the benefit of priority of U.S. Provisional Patent Application Ser. No. 62/189,471, titled "PORTABLE ELECTRONIC DEVICE MOUNTING SYSTEMS AND METHODS," to Theis et al., filed on Jul. 7, 2015; which is incorporated by reference herein in its entirety.

TECHNICAL HELD

This disclosure generally relates to systems, devices and methods for supporting a portable electronic device.

BACKGROUND

Portable electronic devices, including tablet computing devices (also referred to as tablets, or as tablet computers), electronic readers (or "e-readers") are generally planar, lightweight devices that can include a touch-screen display. Example tablet computing devices include the Apple iPad, Kindle Fire, and Samsung Galaxy. Generally, tablets have a rectangular form factor that may be considered smaller than a traditional laptop or desktop computer monitor but larger than a smaller electronic device such as a smartphone.

In many environments a user can operate a tablet while simply holding it in her hands. Some environments, however, may provide other opportunities to position a tablet. For example, a person using a tablet at a desk may place the tablet flat on the desk, prop the tablet up with books, or lean the tablet up against a wall. In some environments, it can be desirable to have a stand that can hold a portable electronic device.

To further illustrate the PORTABLE ELECTRONIC DEVICE MOUNTING SYSTEMS AND METHODS disclosed herein, a non-limiting list of examples is provided here:

In Example 1, an apparatus can be configured to hold a portable electronic device, the apparatus can comprise: a housing assembly including: a housing body; a first arm configured to extend from a first end of the housing body; a first hook and a second hook engaged to and extending from a first end region of the first arm, the first hook having a top and a base and the second hook having a top and a base, the base of the first hook and the base of the second hook being engaged to the first end region of the first arm, a portion of the first hook and a portion of the second hook angularly extending toward the housing body, the first hook and the second hook forming a first hook pair configured to receive a first portion of the portable electronic device; a second arm configured to extend from a second end of the housing body; and a third hook and a fourth hook engaged to and extending from a first end region of the second arm, the third hook having a base and the fourth hook having a base, the base of the third hook and the base of the fourth hook being engaged to the first end region of the second arm, a portion of the third hook and a portion of the fourth hook angularly extending toward the housing body, the third hook and the fourth hook forming a second hook pair configured to receive a second portion of the portable electronic device.

In Example 2, the apparatus of Example 1 can optionally be configured such that the housing defines a first chamber and a second chamber, the first chamber separated from the second chamber by a divider, the first chamber configured to receive at least a portion of the first arm, and the second chamber configured to receive at least a portion of the second arm.

In Example 3, the apparatus of Example 2 can optionally be configured such that the divider defines a plurality of divider teeth, the support comprising a lock rod including: a lock rod body having a first end and a second end; a key lock positioned at the first end of the lock rod body and configured to receive a key; and a plurality of lock rod teeth positioned at the second end of the lock rod body, the plurality of lock rod teeth configured to engage the plurality of divider teeth and prevent movement of the first arm when the lock rod body is turned using the key.

In Example 4, the apparatus of Example 3 can optionally be configured such that the lock rod body extends through a portion of the first arm.

In Example 5, the apparatus of any one or any combination of Examples 1-4 can optionally be configured such that the second arm includes a cover, the cover defining a plurality of notches, the housing assembly including a housing cover and a lock latch rotatingly coupled to the housing cover, the lock latch defining at least one tooth, the lock latch configured to engage one of the plurality of notches and lock the second arm in a position relative to the housing body.

In Example 6, the apparatus of Example 5 can optionally be configured to further comprise a lock spring attached to an end of the lock latch, the lock spring configured to bias the lock latch toward the plurality of notches.

In Example 7, the apparatus of any one or any combination of Examples 1-6 can optionally be configured to further comprise a first boss attached to the housing body; a second boss attached to the first arm; and a spring having a first end engaged to the first boss and a second end engaged to the second boss, the spring configured to bias the first arm towards a closed position.

In Example 8, the apparatus of any one or any combination of Examples 1-7 can optionally be configured such that portion of the first hook and the portion of the second hook angularly extending toward the housing body are straight, and wherein the portion of the third hook and the portion of the fourth hook angularly extending toward the housing body are straight.

Example 9, the apparatus of any one or any combination of Examples 1-8 can optionally be configured such that the first hook and the second hook are not connected to one another, and wherein the third hook and the fourth hook are not connected to one another.

In Example 10, the apparatus of any one or any combination of Examples 1-9 can optionally be configured such that the first portion is a first corner and wherein the second portion is a second corner.

In Example 11, the apparatus of any one or any combination of Examples 1-9 can optionally be configured such that the first portion is a first edge and wherein the second portion is a second edge.

In Example 12, a system can be configured to hold a portable electronic device, the system can comprise: a mounting bracket; a housing assembly configured to couple to the mounting bracket and hold a portable electronic device, the housing assembly including: a housing body; a first arm configured to extend from a first end of the housing body; a first hook and a second hook engaged to and extending from a first end region of the first arm, the first hook having a top and a base and the second hook having a top and a base, the base of the first hook and the base of the second hook being engaged to the first end region of the first arm, a portion of the first hook and a portion of the second hook angularly extending toward the housing body, the first hook and the second hook forming a first hook pair configured to receive a first portion of the portable electronic device; a second arm configured to extend from a second end of the housing body; and a third hook and a fourth hook engaged to and extending from a first end region of the second arm, the third hook having a base and the fourth hook having a base, the base of the third hook and the base of the fourth hook being engaged to the first end region of the second arm, a portion of the third hook and a portion of the fourth hook angularly extending toward the housing body, the third hook and the fourth hook forming a second hook pair configured to receive a second portion of the portable electronic device.

In Example 13, the system of Example 12 can optionally be configured such that the housing defines a first chamber and a second chamber, the first chamber separated from the second chamber by a divider, the first chamber configured to receive at least a portion of the first arm, and the second chamber configured to receive at least a portion of the second arm.

In Example 14, the system of Example 13 can optionally be configured such that the divider defines a plurality of divider teeth, the support comprising a lock rod including: a lock rod body having a first end and a second end and extending through a portion of the first arm; a key lock positioned at the first end of the lock rod body and configured to receive a key; and a plurality of lock rod teeth positioned at the second end of the lock rod body, the plurality of lock rod teeth configured to engage the plurality of divider teeth when the lock rod body is turned using the key.

In Example 15, the system of any one or any combination of Examples 12-14 can optionally be configured such that the second arm includes a cover, the cover defining a plurality of notches, the housing assembly including a housing cover and a lock latch rotatingly coupled to the housing cover, the lock latch defining at least one tooth, the lock latch configured to engage one of the plurality of notches and lock the second arm in a position relative to the housing body.

In Example 16, the system of Example 15 can optionally be configured to further comprise a lock spring attached to an end of the lock latch, the lock spring configured to bias the lock latch toward the plurality of notches.

In Example 17, the system of any one or any combination of Examples 12-16 can optionally be configured to further comprise a first boss attached to the housing body; a second boss attached to the first arm; and a spring having a first end engaged to the first boss and a second end engaged to the second boss, the spring configured to bias the first arm towards a closed position.

In Example 18, the system of any one or any combination of Examples 12-17 can optionally be configured to further comprise a support arm configured to be engaged to a support surface, an end of the support arm configured to couple to the mounting bracket.

In Example 19, the system of Example 18 can optionally be configured such that the support surface is a wall.

In Example 20, the system of any one or any combination of Examples 18-19 can optionally be configured such that the support surface is a generally horizontal work surface, the system comprising: a clamp configured to attach to the work surface; and a riser configured to extend upwardly from the clamp, the support arm configured to slidingly couple to the riser.

Example 21, the system of any one or any combination of Examples 12-20 can optionally be configured to further comprise a base configured to be positioned on a work surface; and a riser configured to extend upwardly from the base, an end of the riser configured to couple to the mounting bracket.

In Example 22, the system of any one or any combination of Examples 12-21 can optionally be configured such that the portion of the first hook and the portion of the second hook angularly extending toward the housing body are straight, and wherein the portion of the third hook and the portion of the fourth hook angularly extending toward the housing body are straight.

In Example 23, the system of any one or any combination of Examples 12-22 can optionally be configured such that the first portion is a first corner and wherein the second portion is a second corner.

In Example 24, the system of any one or any combination of Examples 12-22 can optionally be configured such that the first portion is a first edge and wherein the second portion is a second edge.

In Example 25, the apparatus or system of any one or any combination of Examples 1-24 can optionally be configured such that all elements, operations, or other options recited are available to use or select from.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 20 is top view of the housing assembly of FIG. 19 in an open position.

FIG. 21 is top view of another example of a housing assembly that can hold a portable electronic device.

OVERVIEW

In an example, this disclosure is directed to an apparatus configured to hold a portable electronic device. The apparatus comprises a housing assembly including: a housing body; a first arm configured to extend from a first end of the housing body; a first hook and a second hook engaged to and extending from a first end region of the first arm, the first hook having a top and a base and the second hook having a top and a base, the base of the first hook and the base of the second hook being engaged to the first end region of the first arm, a portion of the first hook and a portion of the second hook angularly extending toward the housing body, the first hook and the second hook forming a first hook pair configured to receive a first portion of the portable electronic device; a second arm configured to extend from a second end of the housing body; and a third hook and a fourth hook engaged to and extending from a first end region of the second arm, the third hook having a base and the fourth hook having a base, the base of the third hook and the base of the fourth hook being engaged to the first end region of the second arm, a portion of the third hook and a portion of the fourth hook angularly extending toward the housing body, the third hook and the fourth hook forming a second hook pair configured to receive a second portion of the portable electronic device.

In another example, this disclosure is directed to a system configured to hold a portable electronic device. The system comprises a mounting bracket; a housing assembly configured to couple to the mounting bracket and hold a portable electronic device, the housing assembly including: a housing body; a first arm configured to extend from a first end of the housing body; a first hook and a second hook engaged to and extending from a first end region of the first arm, the first hook having a top and a base and the second hook having a top and a base, the base of the first hook and the base of the second hook being engaged to the first end region of the first arm, a portion of the first hook and a portion of the second hook angularly extending toward the housing body, the first hook and the second hook forming a first hook pair configured to receive a first portion of the portable electronic device; a second arm configured to extend from a second end of the housing body; and a third hook and a fourth hook engaged to and extending from a first end region of the second arm, the third hook having a base and the fourth hook having a base, the base of the third hook and the base of the fourth hook being engaged to the first end region of the second arm, a portion of the third hook and a portion of the fourth hook angularly extending toward the housing body, the third hook and the fourth hook forming a second hook pair configured to receive a second portion of the portable electronic device.

DETAILED DESCRIPTION

Figure 1:
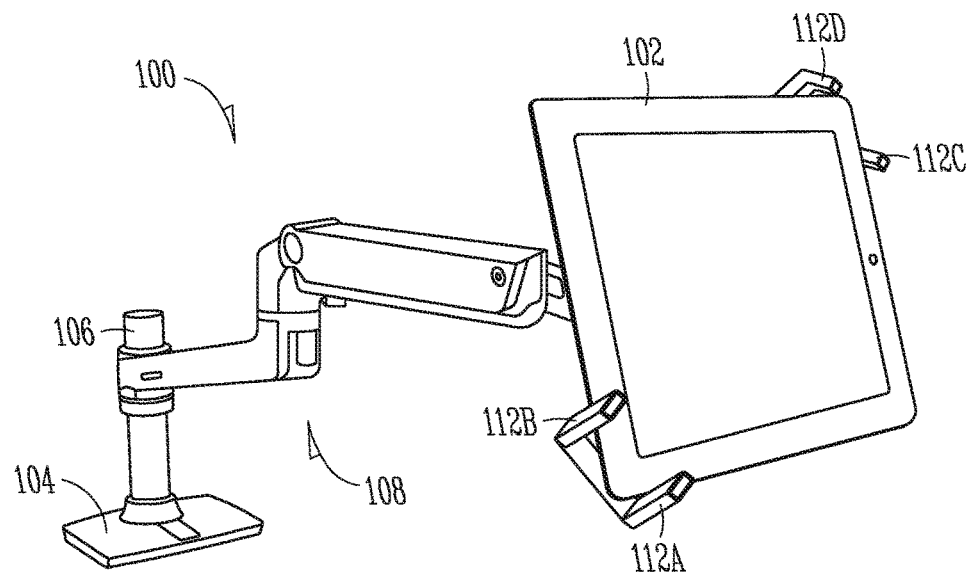
FIG. 1 is a front perspective view of an example of a portable electronic device mounting system configured support a portable electronic device.

FIG. 1 is a front perspective view of an example of a portable electronic device mounting system 100 configured support a portable electronic device 102, e.g., a tablet, an electronic reader ("e-reader" or "e-book"), and the like. The example system 100 can include a clamp 104, a riser 106, a support arm 108, and a housing assembly, shown generally at 110 in FIG. 2, that includes hooks 112A-112D (referred to collectively as "hooks 112" in this disclosure) that are configured to receive portions of the portable electronic device 102, e.g., corners or edges of the device. As will become apparent, the designs described in this disclosure allow easy attachment of a portable electronic device, e.g., tablets, to a mounting system, including a desk stand, a desk clamp arm, wall mount, and the like. The systems described in this disclosure can easily adjust for various device sizes and can secure the device by way of a lock. In an example, the clamp 104 can be combined or substituted with other types of attachment mechanisms or a free standing base.

Figure 2:
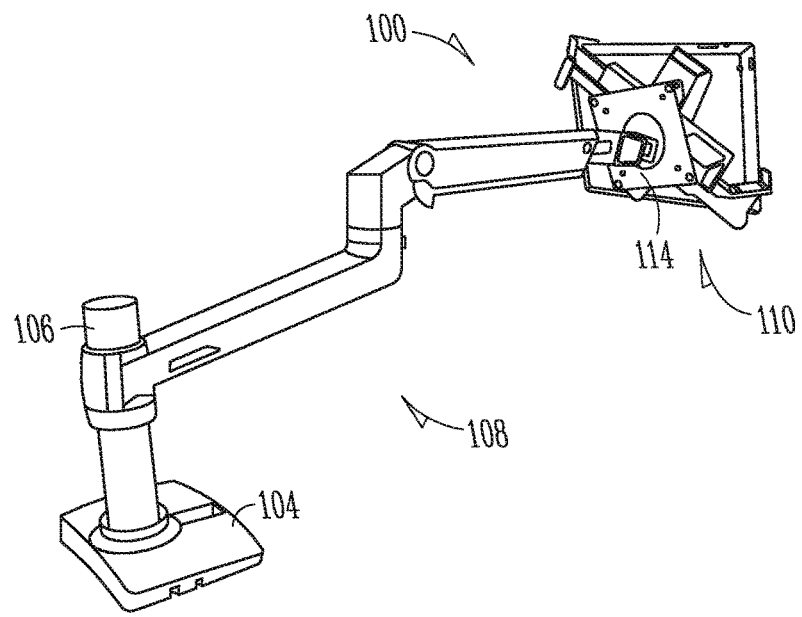
FIG. 2 is a rear perspective view of the example of a portable electronic device mounting system shown in FIG. 1.

FIG. 2 is a rear perspective view of the example of a portable electronic device mounting system 100 shown in FIG. 1. The system 100 can include a mounting bracket 114 configured to couple to the housing assembly 110. In some examples, such as in the system shown in FIG. 2, the mounting bracket 114 can be configured to be coupled to an end of the support arm 108. In an example, the mounting bracket can be a VESA compatible mount configured to be attached to the end of the support arm (or wall mount or desk stand) via a VESA hole pattern on the support arm.

Figure 3:
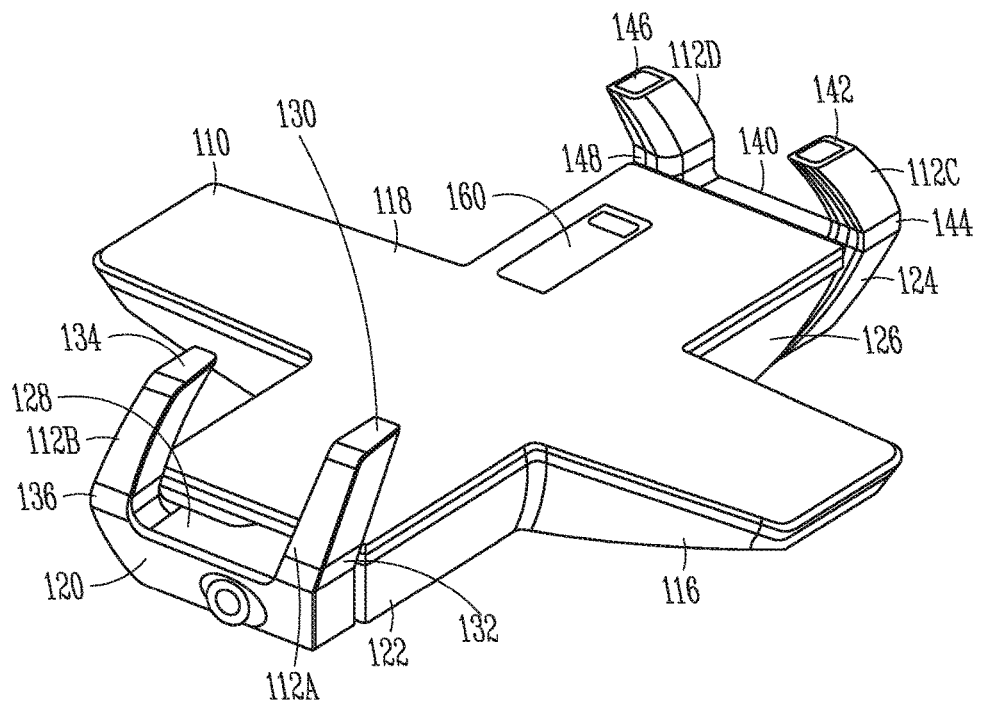
FIGS. 3 and 4 depict front perspective views of an example of a housing assembly that can be configured to hold a portable electronic device.
Figure 4:
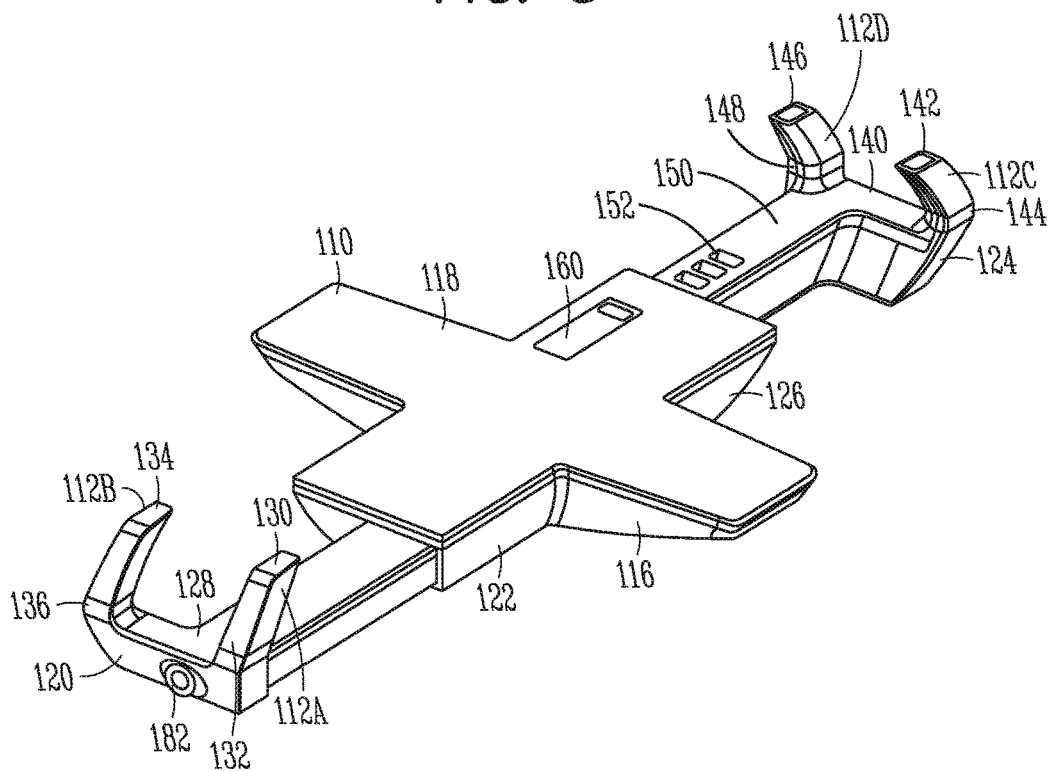

FIGS. 3 and 4 depict front perspective views of an example of a housing assembly 110 that can be configured to hold a portable electronic device. The housing assembly 110 of FIG. 3 is shown in a closed position and the housing assembly 110 of FIG. 4 is shown in an open position. For purposes of conciseness, FIGS. 3 and 4 will be described together.

The housing assembly 110 can include a housing body 116, housing cover 118, a first arm 120 configured to extend from a first end 122 of the housing body 116, and a second arm 124 configured to extend from a second end 126 of the housing body 116. The first arm 120 and the second arm 124 are shown retracted into the housing body 116 in the closed position depicted in FIG. 3 and shown extending outward from the housing body in the open position depicted in FIG. 4.

The housing assembly 110 can further include hooks 112A-112D. The first hook 112A and the second hook 112B can be engaged to and extend from a first end region 128 of the first arm 120. The first hook 112A has a top 130 and a base 132 and the second hook 112B has a top 134 and a base 136. The base 132 of the first hook 112A and the base 136 of the second hook 112B are engaged to the first end region 128 of the first arm 120. As seen in FIGS. 3 and 4, for example, a portion of the first hook 2A and a portion of the second hook 2B angularly extend toward the housing body 116.

Similarly, the third hook 112C and the fourth hook 112D can be engaged to and extend from a first end region 140 of the second arm 124. The third hook 112C has a top 142 and a base 144 and the fourth hook 112D has a top 146 and a base 148. The base 144 of the third hook 112C and the base 148 of the fourth hook 112D are engaged to the first end region 140 of the second arm 124. As seen in FIGS. 3 and 4, for example, a portion of the third hook 112C and a portion of the fourth hook 112D angularly extend toward the housing body 116.

The first hook 112A and the second hook 112B form a first hook pair configured to receive a first portion, e.g., first corner, of the portable electronic device, e.g., tablet, and the third hook 112C and the fourth hook 112D form a second hook pair configured to receive a second portion, e.g., second corner, of the portable electronic device. FIG. 1 depicts an example of first and second hook pairs receiving portions, e.g., corners, of a tablet.

As described in detail below, in some example configurations, the second arm can include a cover 150 that defines a plurality of notches 152. Based on the size of the device, a user can adjust the position of the second arm by selecting one of the notches 152, e.g., to center the housing with the device, and lock the position of the second arm 124 relative to the housing body 116, e.g., using a lock latch as described below. In some examples, the first arm 120 can be spring loaded to bias the first arm toward the housing body 116. A user can pull the first arm outwardly away from the housing body 116 and insert a corner of the device between the hooks of the first hook pair. After the user inserts the device, the spring can pull the first arm 120 inwardly toward the housing body 116, which secures the device between the hooks of the first hook pair and the second hook pair.

In some example configurations, such as shown in FIG. 4, the first hook 112A and the second hook 112B are not connected to one another, and the third hook 112C and the fourth hook 112D are not connected to one another. In other example configurations, as described below, the hooks of a hook pair can be connected to one another.

Figure 5:
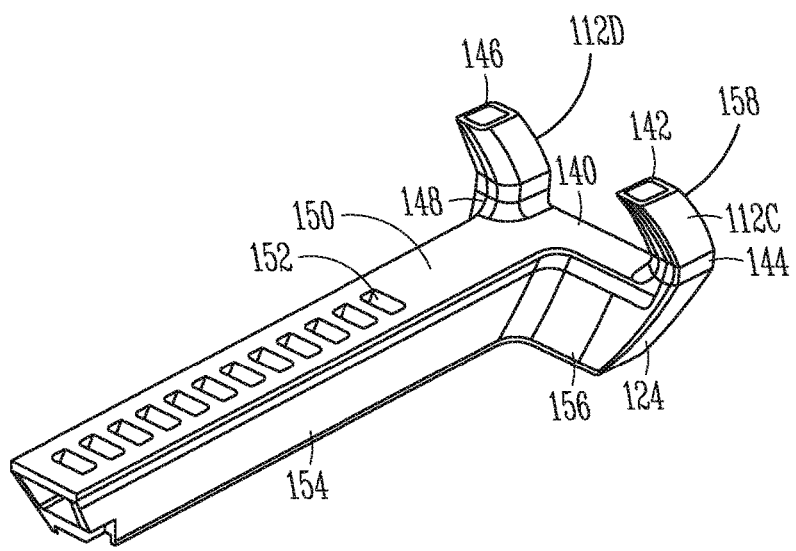
FIG. 5 is a perspective view of an example of a second arm of the housing assembly of FIG. 4.

FIG. 5 is a perspective view of an example of a second arm 124. The second arm 124 can include a body 154, third and fourth hooks 112C, 112D, a head 156, and a cover 150 defining a plurality of notches 152. In some example implementations, the second arm 124 can be formed as a single component. In other example implementations, the second arm 124 can be constructed in multiple pieces as a subassembly. For example, each section of the second arm 124, including the elongated body 154 and the head 156 and hooks 112 can be formed individually and assembled together.

As described above, the hooks 112 can include a portion that angularly extends toward the housing body 116, which can allow the hooks to secure the corners of the device 102. The portion 158 of the hook 112C in FIG. 5 angularly extends toward the housing body (hook 112D includes a similar portion, not labeled). In some example configurations, such as shown in FIG. 5, the portion 158 can be straight.

Figure 6:
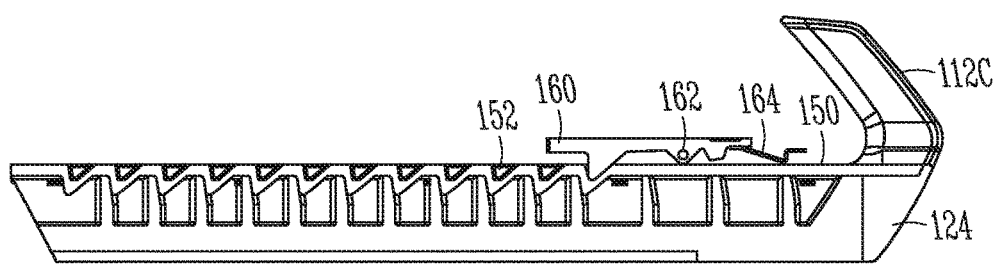
FIG. 6 is a partial side cutaway view of an example of the second arm of FIG. 5.

FIG. 6 is a partial side cutaway view of an example of the second arm 124. The housing assembly 116 of FIGS. 3 and 4 can include a lock latch 160 that defines at least one tooth, e.g., proximate a first end of the lock latch 160. The lock latch 160 can be configured to engage one of the plurality of notches 152 of cover 150 and lock the second arm 124 in a position relative to the housing body 116. The housing cover has been removed in FIG. 6 for clarity. In some examples, the lock latch 160 can be coupled to the housing cover 118, as seen in FIGS. 3 and 4. For example, the lock latch 160 can be mounted on top of the second arm and rotatingly coupled to the housing cover, e.g., using a pin 162 that forms the axis of rotation.

In some example implementations, the assembly can include a lock spring 164, e.g., a leaf spring, attached to a second end of the lock latch 160. The lock spring 164 can be configured to bias the lock latch 160 toward the plurality of notches 152, e.g., in a counterclockwise direction in FIG. 6.

Figure 7:
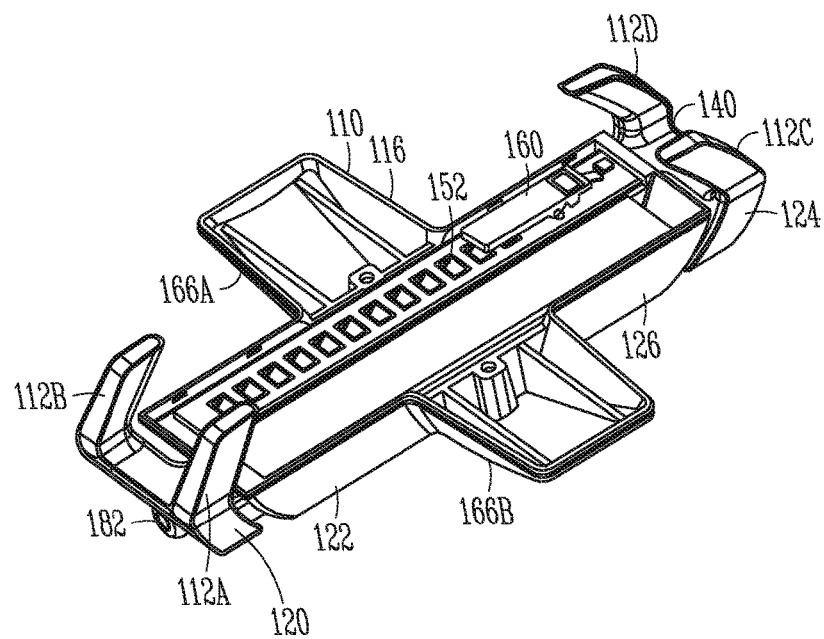
FIGS. 7 and 8 are front perspective views of an example of the housing assembly with the housing cover removed.
Figure 8:
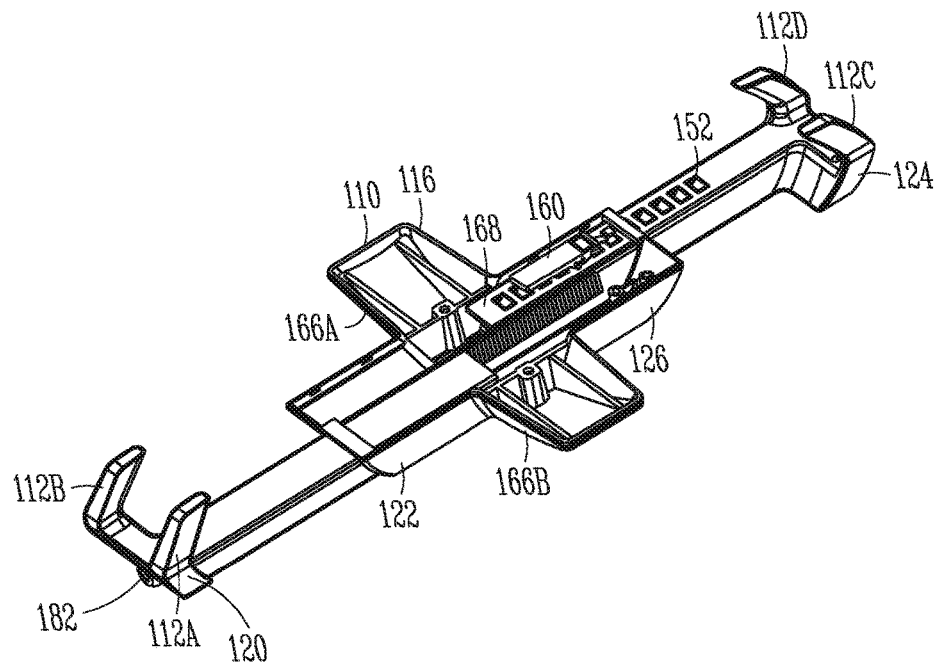

FIGS. 7 and 8 are front perspective views of an example of the housing assembly 110 with the housing cover removed. The housing assembly 110 of FIG. 7 is shown in a closed position and the housing assembly 110 of FIG. 8 is shown in an open position. For purposes of conciseness, FIGS. 7 and 8 will be described together.

As seen in FIG. 7, the first arm 120 and the second arm 124 are shown retracted into the housing assembly 110 in the closed position. The lock latch 160 is shown engaged to one of the notches 152 toward the first end region 140 of the second arm 124.

In some example configurations, the housing assembly 110 can include one or more extended portions (or "wings") 166A, 166B. The wings 166A, 166B can increase the amount of surface area of the housing assembly 110 that is in contact with the portable electronic device, which can provide additional support to the device.

In FIG. 8, the first arm 120 and the second arm 124 are shown extending outward from the housing assembly in the open position. The lock latch 160 is shown engaged to one of the notches 152 toward the second end 168 of the second arm.

Figure 9:
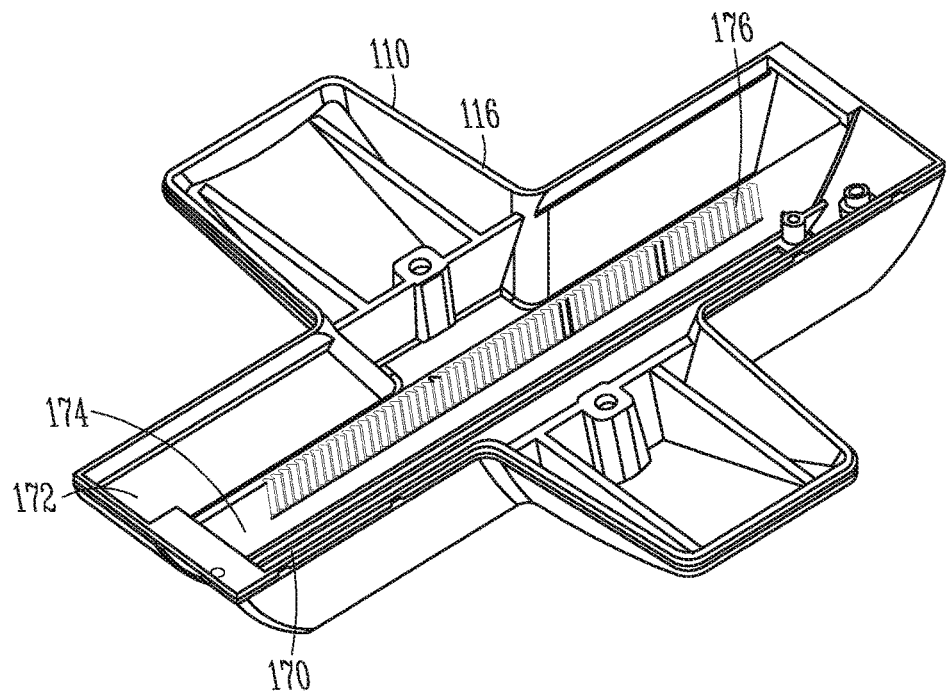
FIG. 9 is a front perspective view of an example of the housing body of FIG. 8 with the housing cover removed.

FIG. 9 is a front perspective view of an example of the housing assembly 110 with the housing cover removed. In the example shown in FIG. 9, the housing body 116 can define a first chamber 170 and a second chamber 172, where the first chamber 170 is separated from the second chamber 172 by a divider 174. As seen in FIG. 9, the first chamber 170 is configured to receive at least a portion of the first arm 120, and the second chamber 172 is configured to receive at least a portion of the second arm 124.

In some example configurations, the divider 174 can define a plurality of divider teeth 176. For example, the plurality of divider teeth 176 can extend along at least a portion of a length of the divider 174. As described in detail below, the divider teeth 176 can be configured to receive one or more teeth of a lock rod, which can secure the first arm 120 in place relative to the housing body 116.

Figure 10:
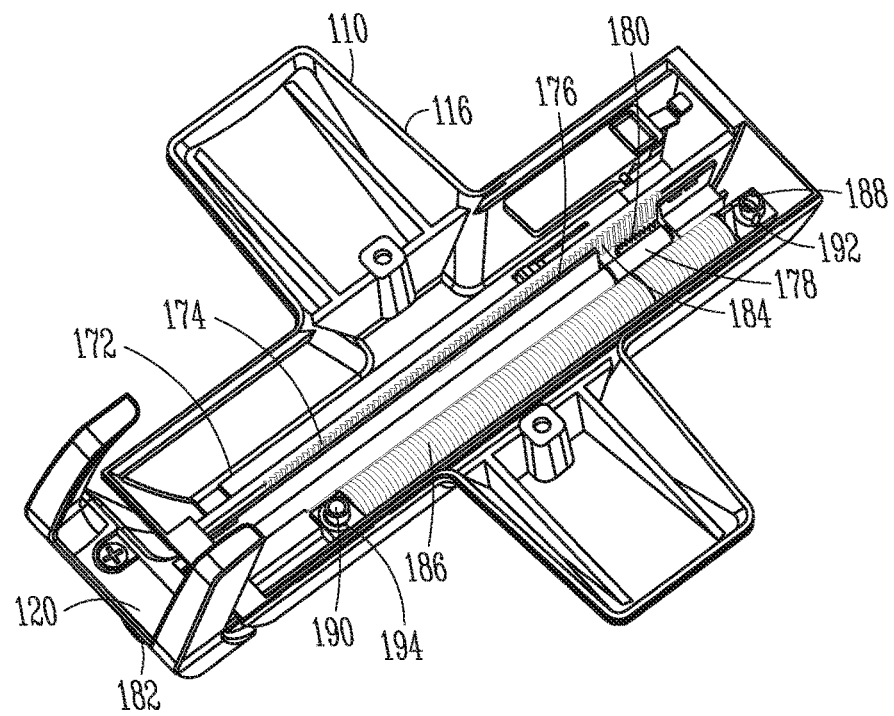
FIG. 10 is a front perspective view of an example of the housing body of FIG. 8 with the housing cover removed.

FIG. 10 is a front perspective view of an example of the housing assembly 110 with the housing cover removed. The first arm 120 is shown in the closed position. The second arm and the top surface of the first arm 120 have been removed. As mentioned above, the housing assembly 110 can include a lock rod 178 that includes a lock rod body having a plurality of lock rod teeth positioned at the end of the lock rod body (shown in detail in FIG. 12). In FIG. 10, the lock rod teeth 180 are shown engaging a plurality of divider teeth.

In some examples, the lock rod can include a key lock 182 positioned at the first end of the lock rod 178 and configured to receive a key (not depicted). When a user turns the key (or, in some examples, just the lock rod if no key lock is included), the lock rod 178 can rotate between a locked position in which the first arm is secured relative to the housing body 116 and an unlocked position in which the first arm can be moved relative to the housing body 116.

In some example configurations, a portion of the first arm 120, e.g., a portion of a side of the first arm 120, can define a lock window 184 sized and shaped to permit the lock rod body to turn such that the lock rod teeth 180 can extend through the window 184 and engage the divider teeth 176. As seen in FIG. 10, in some example configurations, the lock rod 178 can extend through a portion of the first arm 120 although other configurations are contemplated.

As mentioned above, in some examples, the first arm 120 can be spring loaded to bias the first arm toward the housing body 116 using a spring 186, e.g., an extension spring. A user can pull the first arm 120 outwardly away from the housing body 116 and insert a corner of the device between the hooks of the first hook pair. In an example configuration, the housing assembly can include a first boss 188 attached to the housing body 116. In some implementations, the first boss 188 can be formed integral with the housing body 116. The housing assembly 110 can include a second boss 190 attached to the first arm 120. In some implementations, the second boss 190 can be formed integral with the first arm 120. A first end 192 of the spring 186 can be engaged to the first boss 188 and a second end 194 of the spring 186 can be engaged to the second boss 190. The spring 186 can bias the first arm 120 towards the closed position, as seen in FIG. 10.

Figure 11:
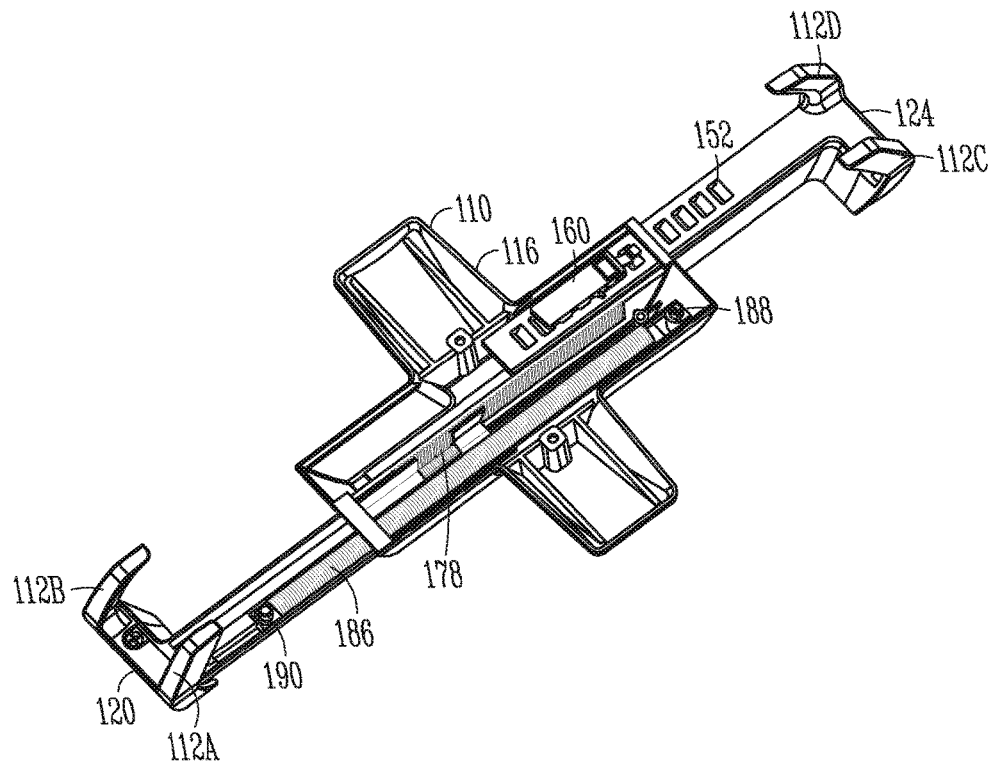
FIG. 11 is a front perspective view of an example of the housing body of FIG. 8 with the housing cover removed.

FIG. 11 is a front perspective view of an example of the housing body 116 with the housing cover removed. The first arm 120 and the second arm 124 are shown in the open position. In FIG. 11, the lock rod 178 has been rotated, e.g., clockwise, to allow the user to pull the first arm 120 outwardly away from the housing body 116. The spring 186 is shown in a stretched or extended state in FIG. 11. A user could insert a device between the hooks 112 and then turn the lock rod 178 to lock the first arm 120 in position, thereby securing the device in place.

Figure 12:
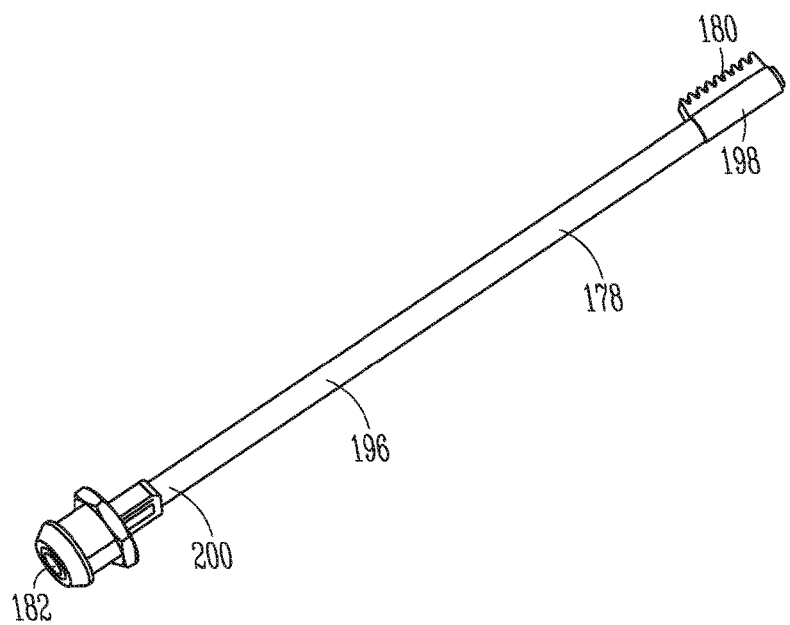
FIG. 12 is a perspective view of an example of a lock rod.

FIG. 12 is a perspective view of an example of a lock rod 178. As described above, the lock rod 178 can include an elongated rod 196 and a plurality of lock rod teeth 180 positioned at a first end 198 of the rod 196. In some examples, the lock rod 178 can include a key lock 182 positioned at the second end 200 of the rod 196 and configured to receive a key (not depicted). When a user turns the key, the lock rod 178 can rotate between a locked position in which the first arm is secured relative to the housing body 116 and an unlocked position in which the first arm can be moved relative to the housing body 116.

As the lock rod 178 is rotated, e.g., about 90 degrees in a clockwise direction, the lock rod teeth 180 also rotate together with the lock rod. The lock rod teeth 180 disengage from the divider teeth 176 located on the housing body 116. In this lock rod position, the user can move the first arm 120 in and out of the housing body 116. When a desired extension of the first arm 120 is reached, the user can rotate the key lock, e.g., in a counterclockwise direction by about 90 degrees. In this position, the lock rod teeth 180 extend out of the window 184 on the first arm 120, and engage the divider teeth, thereby locking the first arm 120 in place.

In some example implementations in which the user is not concerned with security, e.g., for home use, the key lock can be removed and replaced with a thumbscrew, handle, or some other mechanism that allows a user to turn the lock rod 178.

Figure 13:
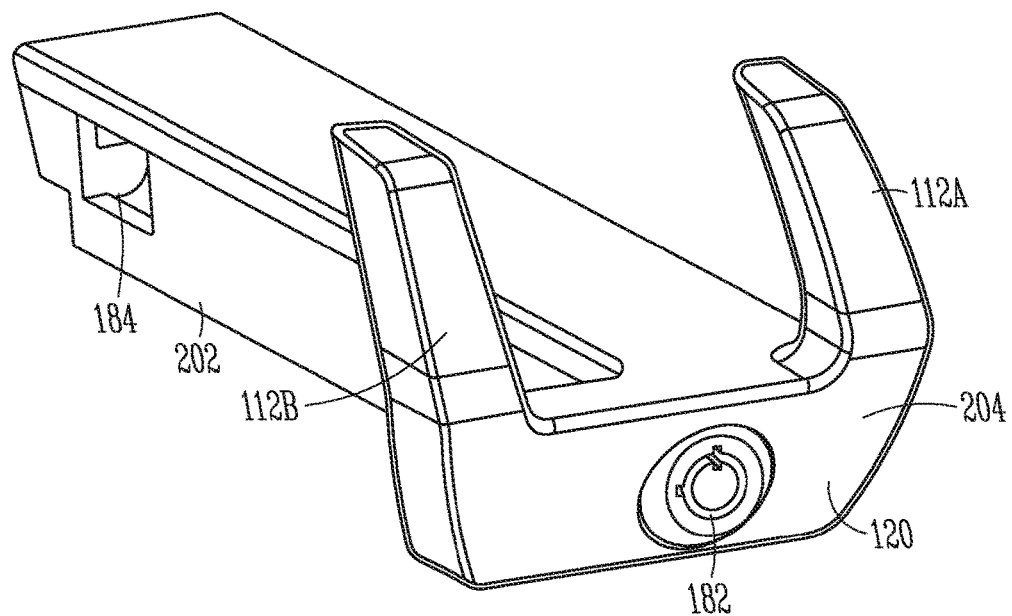
FIGS. 13 and 14 are perspective views of an example of a first arm of the housing assembly of FIG. 4.
Figure 14:
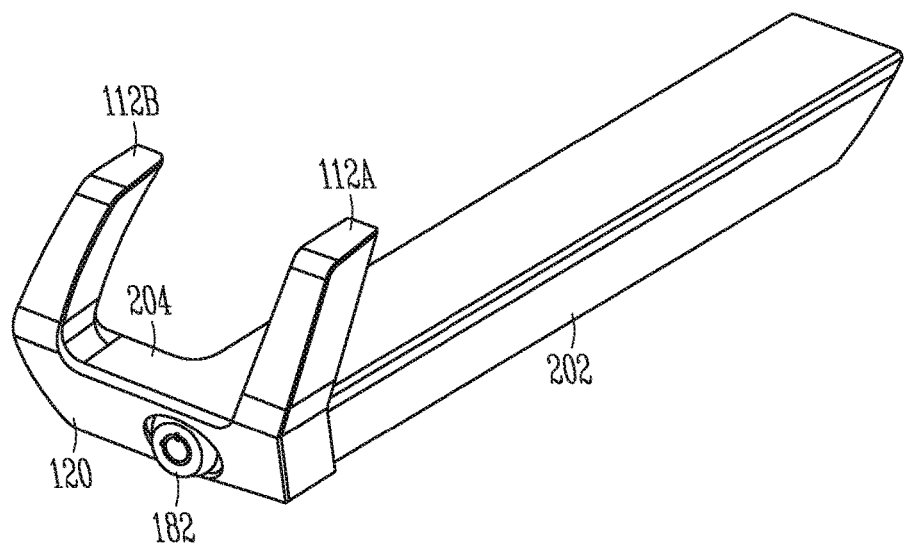

FIGS. 13 and 14 are perspective views of an example of a first arm 120. For purposes of conciseness, FIGS. 13 and 14 will be described together. The first arm 120 can include a body 202, first and second hooks 112A, 112B, a head 204, a key lock 182, and can define a lock window 184. In some example implementations, the first arm 120 can be formed as a single component. In other example implementations, the first arm 120 can be constructed in multiple pieces as a subassembly. For example, each section of the first arm 120, including the elongated body 202, the head 204, and the hooks 112 can be formed individually and assembled together. In some examples, the body 202 can be formed as a hollow section. As described above, a spring 186 and a lock rod 178 (shown in FIG. 10) can be positioned inside the first arm 120.

Figure 15:
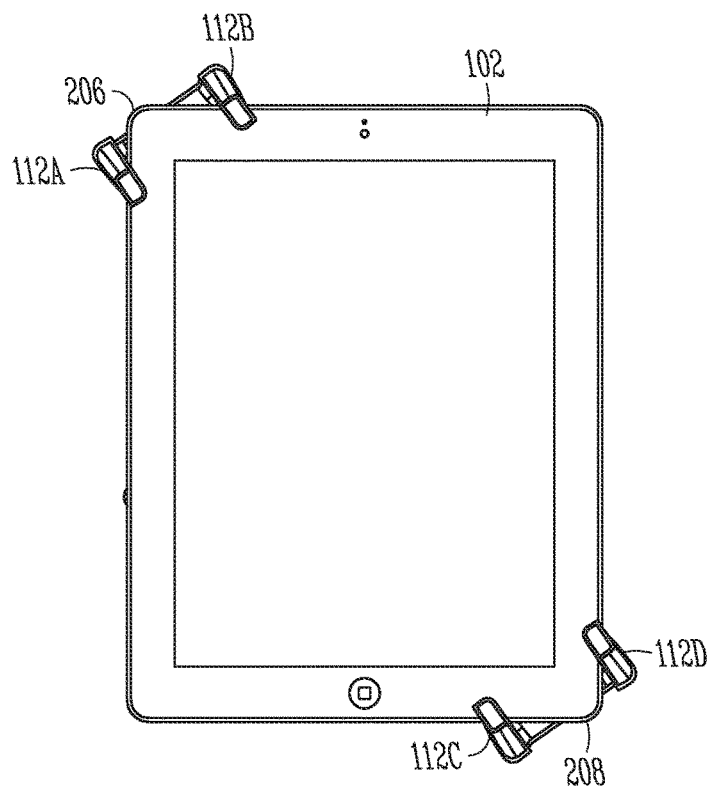
FIG. 15 is a front view of a portable electronic device supported by between hooks of the housing assembly of FIG. 4.

FIG. 15 is a front view of a portable electronic device 102 supported by between hooks 112 of the housing assembly of FIG. 4, in accordance with various techniques of this disclosure. As seen in FIG. 15, a first corner 206 of the device 102, e.g., a tablet, is received between the first hook 112A and the second hook 112B, and a second corner 208 of the device 102 is received between the third hook 112C and the fourth hook 112D. The hooks 112 can be located proximate the corners of the device 102, as shown, and can extend towards the front of the device to capture and secure the device to the housing assembly 110.

Figure 16:
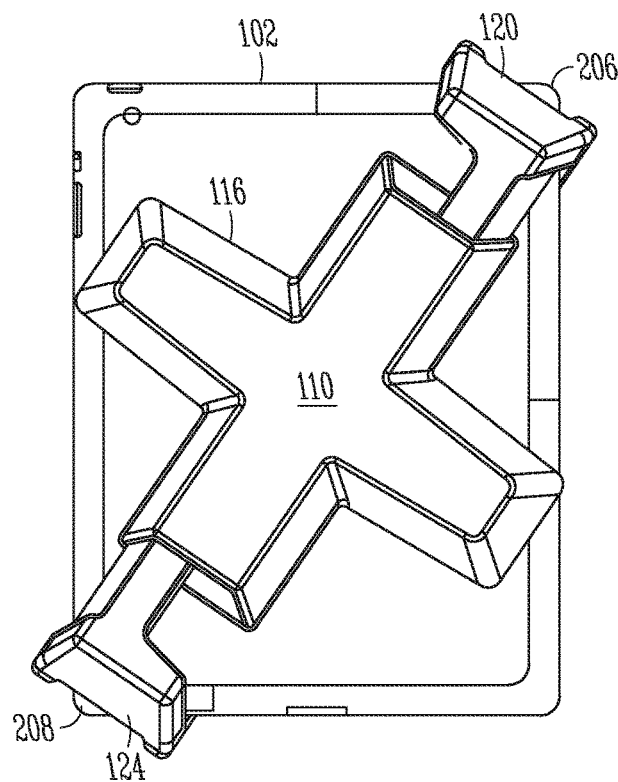
FIG. 16 is a rear view of a portable electronic device supported by between hooks of the housing assembly of FIG. 4.

FIG. 16 is a rear view of a portable electronic device 102 supported by between hooks 112 of the housing assembly of FIG. 4. As seen in FIG. 16, the first arm 120 and the second arm 124 are extended outwardly from the housing body 116 of the housing assembly 110. A first corner 206 of the device 102, e.g., a tablet, is received between the first hook 112A and the second hook 112B located at the end of the first arm 120, and a second corner 208 of the device 102 is received between the third hook 112C and the fourth hook 112D of the second arm 124. The distance between the hooks 112 of the first arm 120 and the hooks 112 of the second arm 124 can be adjusted depending on the size of the device to securely grab the device at its corners.

Figure 17:
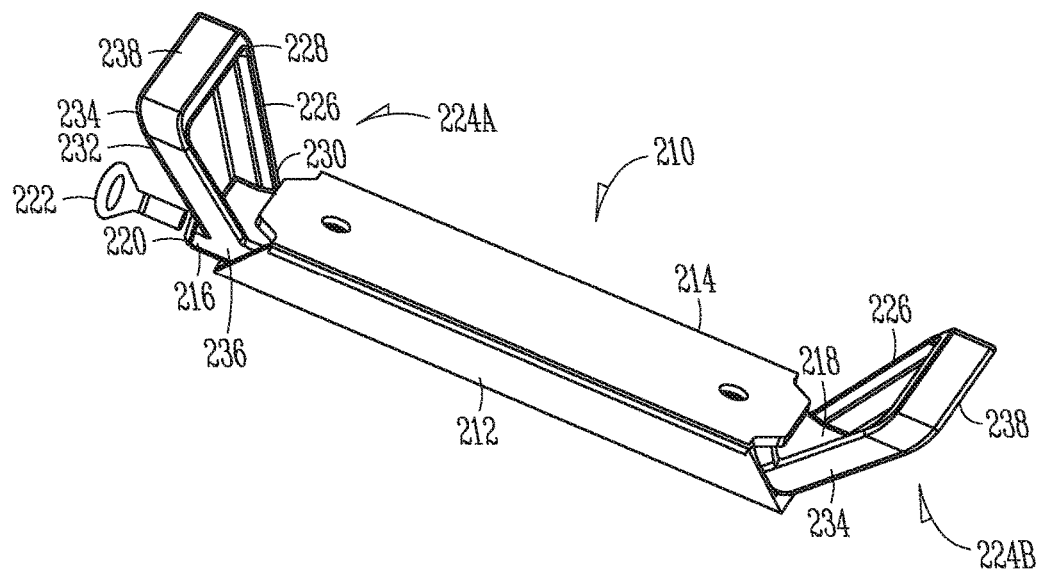
FIG. 17 is a front perspective view of another example of a housing assembly that can used to hold a portable electronic device.

FIG. 17 is a front perspective view of another example of a housing assembly that can used to hold a portable electronic device. The housing assembly 210 of FIG. 17 can include housing body 212, a housing cover 214, a first arm 216, a second arm 218, and a key lock 220 configured to receive a key 222. In contrast to the housing body 116 of FIG. 7, the housing body 212 of FIG. 17 is substantially straight and does not include the extended portions (or "wings") 166 of FIG. 7.

In addition, the housing assembly 210 of FIG. 17 can include first and second hook pairs 224A, 224B. In contrast to the hooks 112A-112D of FIGS. 7 and 8, for example, the hook pairs 224A, 224B of FIG. 17 angularly extend away from the housing body 212. Further, each hook pair 224A, 224B can include a first hook 226 having a top 228 and a base 230 engaged to an arm, a second hook 232 having a top 234 and a base 236 engaged to the arm, and a third portion 238 that connects the first and second hooks 226, 232. The operation of the housing assembly 210 of FIG. 17 is similar to the housing assembly of FIGS. 7 and 8 and, for purposes of conciseness, will not be described again.

Figure 18:
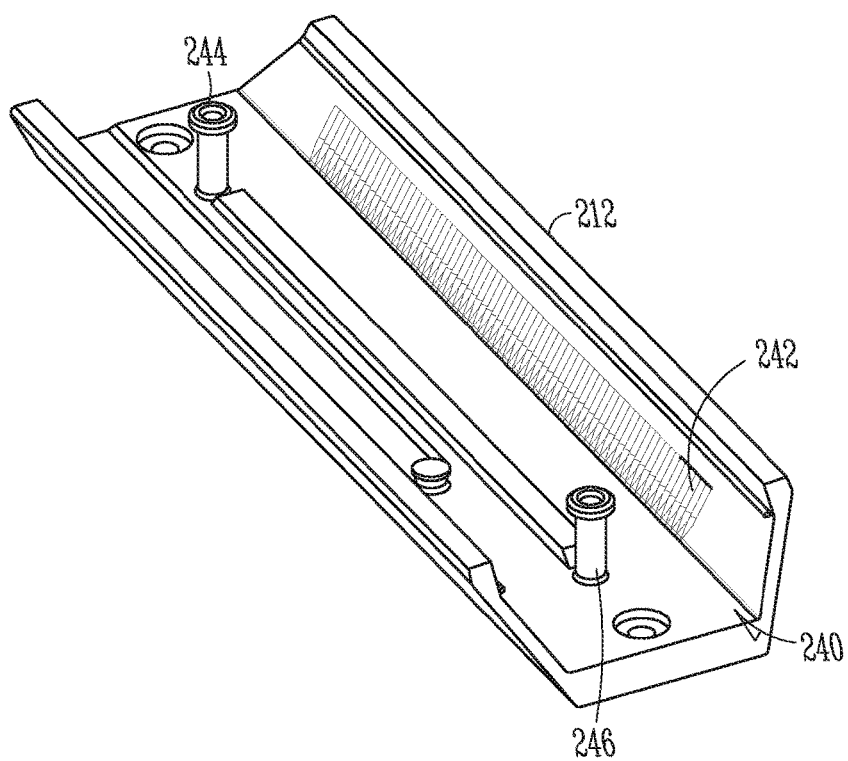
FIG. 18 is front perspective view of another example of a housing body that can be used to hold a portable electronic device.

FIG. 18 is front perspective view of another example of a housing body 212 that can be used to hold a portable electronic device. Instead of having two chambers separated by a divider with a plurality of teeth, as in FIG. 9, the housing body 212 of FIG. 18 can include a single chamber 240 having a plurality of teeth 242 formed into and extending along at least a portion of a length of a side of the housing body 212. The housing body 212 can include a first pin 244 and second pin 246 fixedly attached to the housing body 212. As described below with respect to FIG. 19, the first and second pins 244, 246 can be used to assist in synchronizing movement of the first and second arms.

Figure 19:
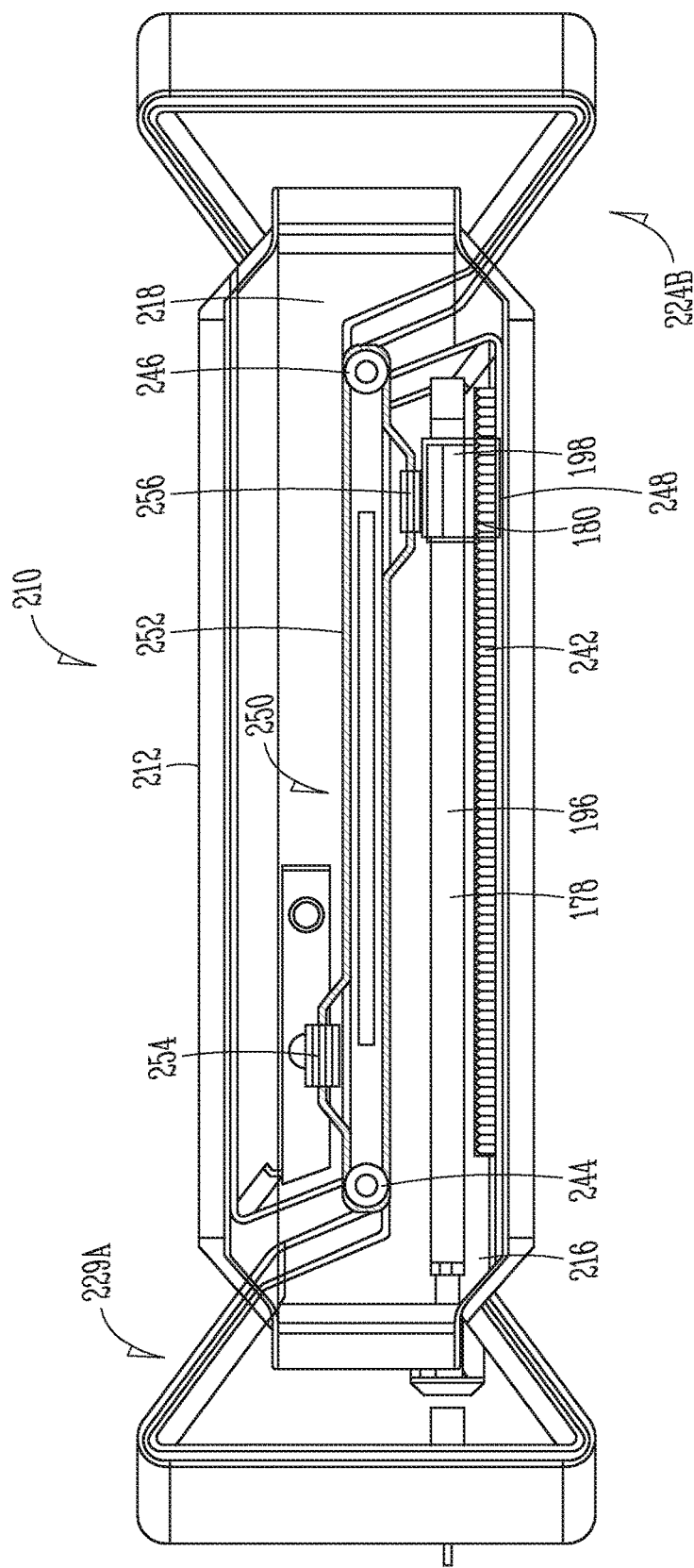
FIG. 19 is top view of another example of a housing assembly that can hold a portable electronic device.

FIG. 19 is top view of another example of a housing assembly 210 that can hold a portable electronic device. The housing assembly 210 of FIG. 19 can include the housing body 21 shown in FIG. 18 and first and second arms 216, 218. The housing assembly 210 of FIG. 19 is shown in a closed position in which the arms 216, 218 are in a retracted state. The housing body 212 can include a single chamber having a plurality of teeth 242 formed into and extending along at least a portion of a length of a side of the housing body 212.

The housing assembly can include a lock rod 178 that can include an elongated rod 196 and a plurality of lock rod teeth 180 positioned at a first end 198 of the lock rod 178, such as shown and described above in FIG. 12. As described above, a side portion of the first arm can define a window 248 such that when a desired extension of the first arm 216 is reached, the user can rotate the key lock, e.g., in a counterclockwise direction by about 90 degrees. In this position, the lock rod teeth 180 extend out of the window 248 on the first arm 216, and engage the teeth 242 on the housing body, thereby locking the first arm 216 in place.

The housing assembly 210 can include a rope assembly 250 attached to the arms 216, 218 to synchronize the movement of the arms. This is in contrast to the housing assembly described above in which the arms can move independently of one another. The rope assembly 250 can include a rope loop 252 (or any some other flexible material) and a first crimp 254 and a second crimp 256 that are attached to the rope loop 252. The first crimp 254 can be attached to the first arm 216 and the second crimp 256 can be attached to the second arm 218. The rope loop 252 can be routed around the first pin 244 and the second pin 246. When a user pulls one arm, e.g., the first arm 216, the rope 252 pulls the second arm 218, so that both arms move in and out together. By attaching the rope loop 252 to the arms 216, 218, the movement of the arms can be synchronized.

Each arm 216, 218 can extend longitudinally out of the housing body 212 by the same amount. In some example implementations, an extension spring (not depicted) can be included in the arm assembly, e.g., in the first arm 216 and/or the second arm 218, to bias the arms towards the closed position.

FIG. 20 is top view of the housing assembly 210 of FIG. 19 in an open position. The housing assembly 210 of FIG. 20 is shown with the arms 216, 18 in an extended state. Because the first crimp 254 is attached to the first arm 216 and secured about the rope loop 252 and the second crimp 256 is attached to the second arm 218 and secured about the rope loop 252, a user pulling/pushing the first arm 216 (or the second arm 218) causes the second arm 218 (or the first arm 216) to also move synchronously.

In operation, the user can pull the arms 216, 218 out of the housing body to insert the portable electronic device, e.g., tablet, between the hook pairs 224A, 224B. After the device is inserted between the hook pairs, the user can push the arms together to secure the device to the housing assembly. In some example configurations that include an internal spring, the spring can pull the hook pairs 224A, 224B on the first and second arm 216, 218 against the device to secure the tablet. In such a configuration, the housing body 212 can be automatically centered on the device.

FIG. 21 is top view of another example of a housing assembly 260 that can hold a portable electronic device. Instead of synchronizing the first and second arms 262, 264 using a rope assembly, as in FIGS. 19 and 20, the housing assembly 260 of FIG. 21 can use a gear assembly having a gear 266 with teeth rotatingly coupled to the housing body 268. The housing assembly 260 of FIG. 21 is shown in a closed position in which the arms 262, 264 are in a retracted state.

Figure 22:
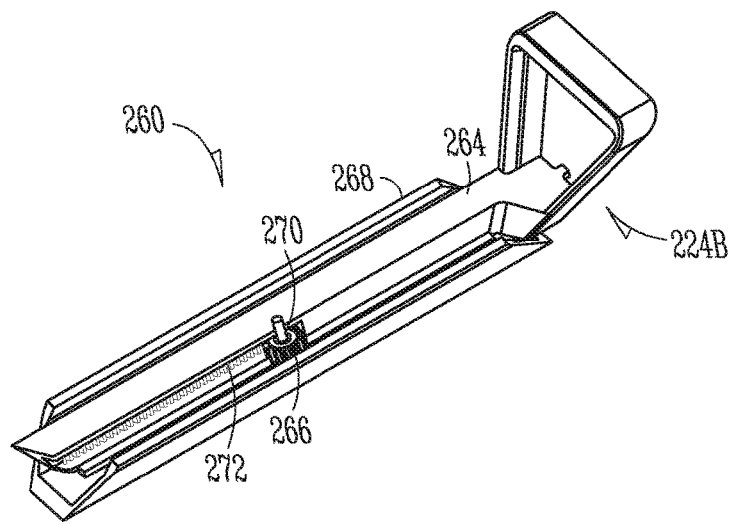
FIG. 22 is a perspective view of a portion of the housing assembly of FIG. 21.
Figure 23:
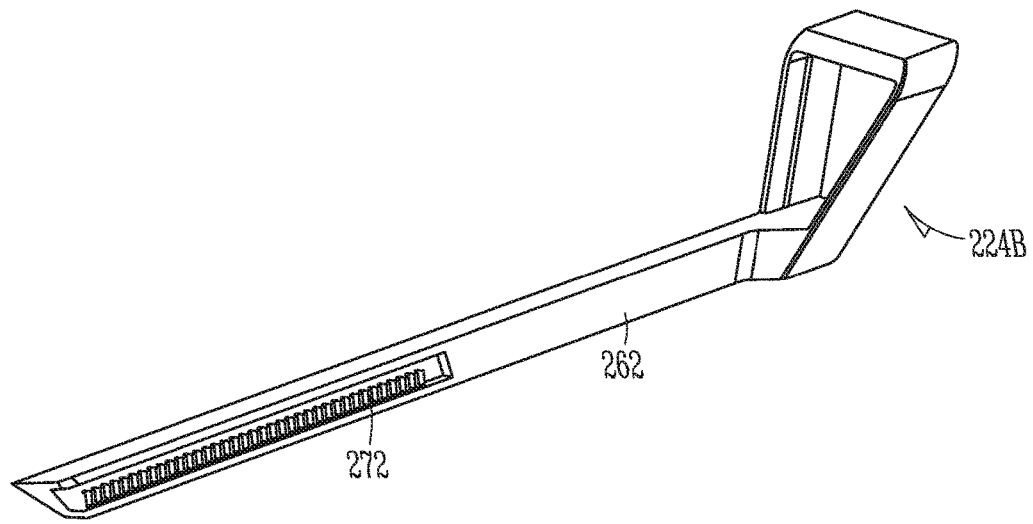
FIG. 23 is a side view of the first arm of FIG. 22, depicting a plurality of teeth configured to engage the teeth on a gear.

FIG. 22 is a perspective view of a portion of the housing assembly 260 of FIG. 21. For illustration purposes, the first arm 262 has been removed to depict the gear 266 coupled to the housing body 268 via a pin 270. A plurality of teeth 272 can be formed into a longitudinal section of the first arm 262 (shown in FIG. 23) and the second arm 264. The teeth of the arms 262, 264 can engage the teeth on the gear 266 such that motion of the first arm 262 and the second arm 264 in the longitudinal direction can be synchronized.

In some example configurations, the housing assembly 260 can include an internal spring (not depicted). In such configurations, the spring can pull the hook pairs 224A, 224B on the first and second arms 262, 264 against the device to secure the tablet, which can automatically center the housing body 268 on the device.

2 is a side view of the first arm 262 of FIG. 22, depicting a plurality of teeth 272 configured to engage the teeth on the gear 266.

Figure 24:
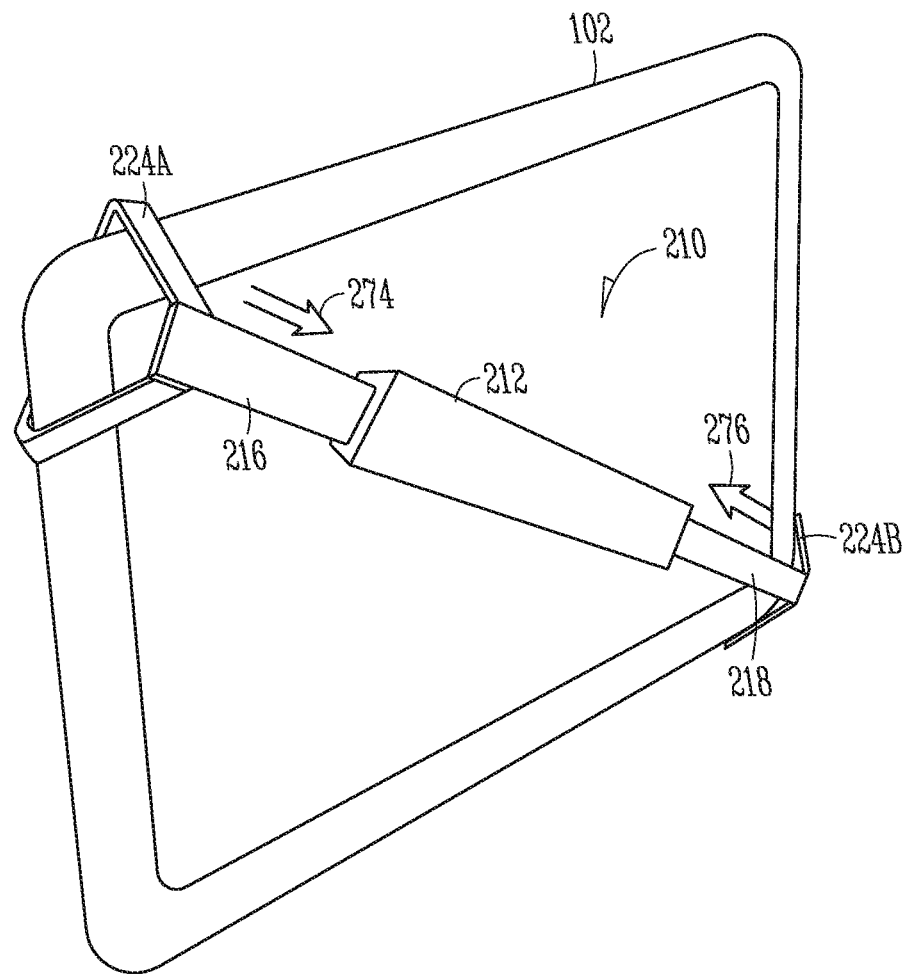
FIG. 24 is a perspective rear view of an example of a housing assembly holding a portable electronic device.

FIG. 24 is a perspective rear view of an example of a housing assembly, e.g., housing assembly 210 of FIG. 20, holding a portable electronic device 102. The two hook pairs 224A, 224B can catch two of the corners of the device 102 and, in some configurations, can be pulled toward the housing body 212, e.g., by an internal spring, as depicted by arrows 274, 276.

Figure 25:
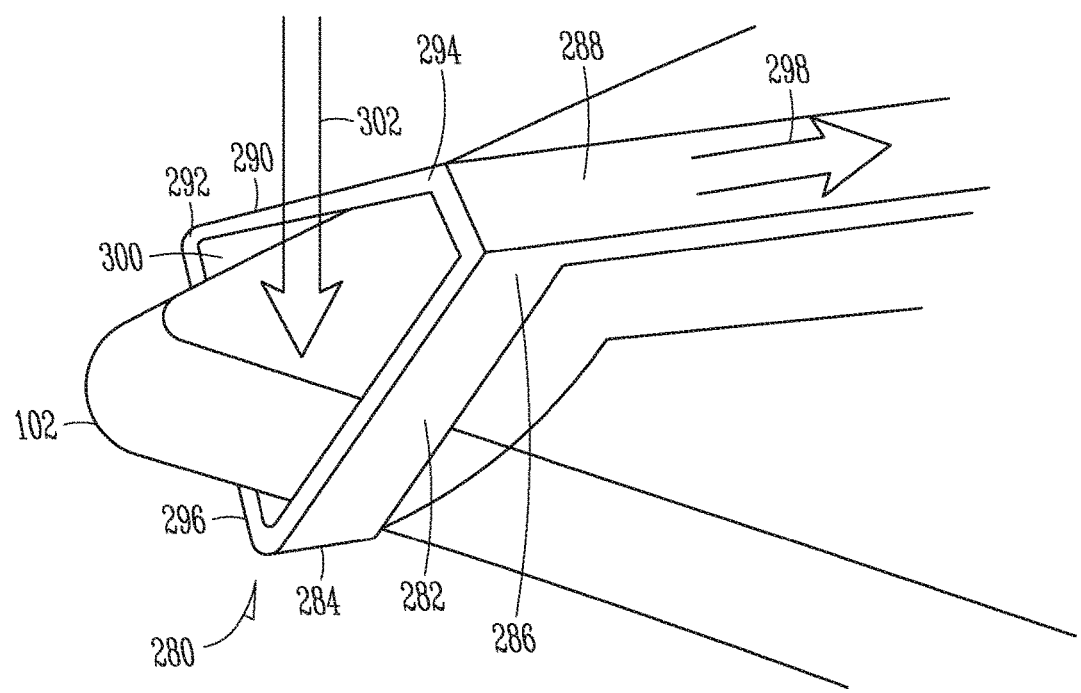
FIG. 25 is a perspective rear view of an example of a hook pair that can be used with a housing assembly to hold a portable electronic device.

FIG. 25 is a perspective rear view of an example of a hook pair that can be used with a housing assembly to hold a portable electronic device. In some examples, the hook pair 280 of FIG. 25 can be similar to the hook pair 216 shown in FIG. 17. The hook pair 280 of FIG. 25 can include a first hook 282 having a top 284 and a base 286 engaged to an arm 286, a second hook 290 having a top 292 and a base 294 engaged to the arm 288, and a third portion 296 that connects the first and second hooks 282, 290. In some examples, the third portion 296 can extend partially between the first and second hook without connecting the first and second hooks together.

In the configuration shown in FIG. 25, the first hook 282 and the second hook 290 can extend out and away from the arm 288 in a forward and lateral direction. Pulling the arm 288 and the hook pair 280 toward the center of the device 102 (shown by arrow 298) can push the tablet forward towards the front face 300 of the third portion 296 (shown by arrow 302).

Figure 26A:
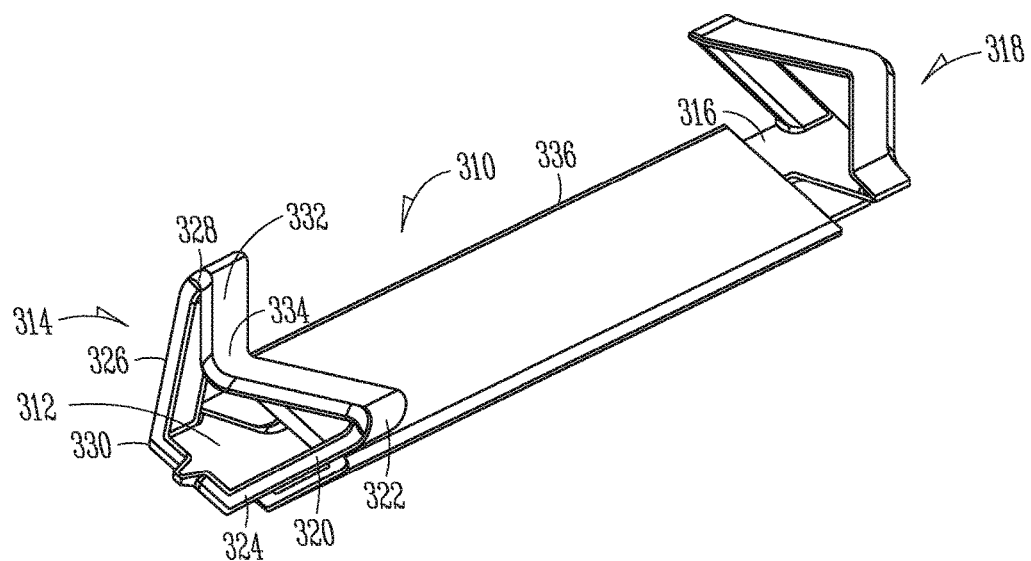
FIG. 26A is a perspective front view of another example hook configuration and housing assembly that can be used to secure a portable electronic device.

FIG. 26A is a perspective front view of another example hook configuration and housing assembly that can be used to secure a portable electronic device. The housing assembly 310 can include a first arm 312 having a first hook pair 314 and a second arm 316 having a second hook pair 318. The first hook pair 314 of FIG. 26A can include a first hook 320 having a top 322 and a base 324 engaged to an arm 312, a second hook 326 having a top 328 and a base 330 engaged to the arm 312, and a third portion 332 that connects the first and second hooks 320, 326. As seen in FIG. 26A, the third portion 332 can include a bend or jog 334, e.g., such that the third portion is generally V-shaped. The bend 334 can extend away from the center of the housing body 336 so that the hook pair 314 does not interfere with the viewable portion of the device. The second hook pair 318 is similar to the first hook pair and for brevity will not be described.

Figure 26B:
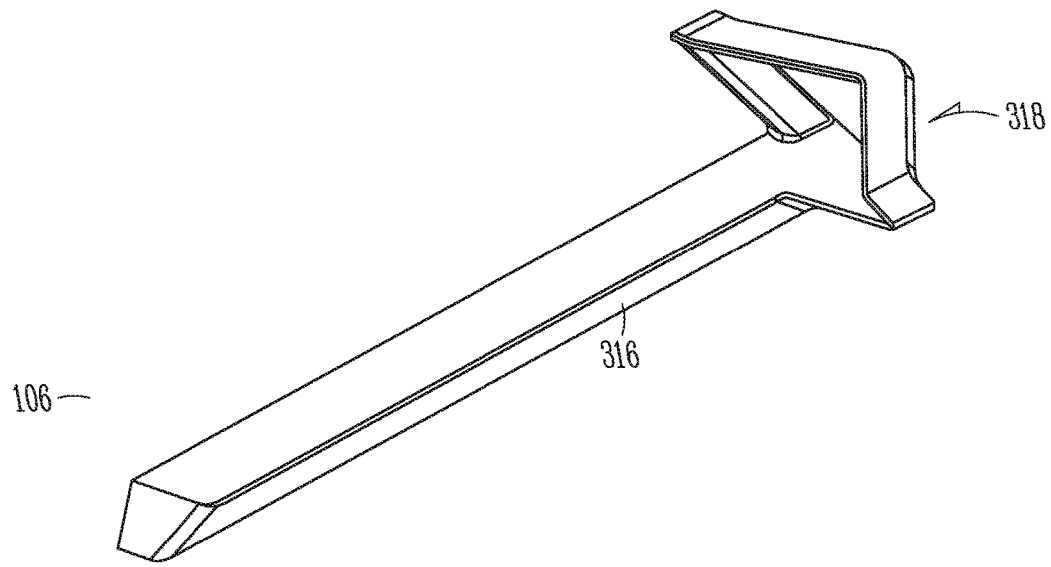
FIG. 26B is front perspective view of the second arm and the second hook pair of FIG. 26A.

FIG. 26B is front perspective view of the second arm 318 and the second hook pair 318.

Figure 26C:
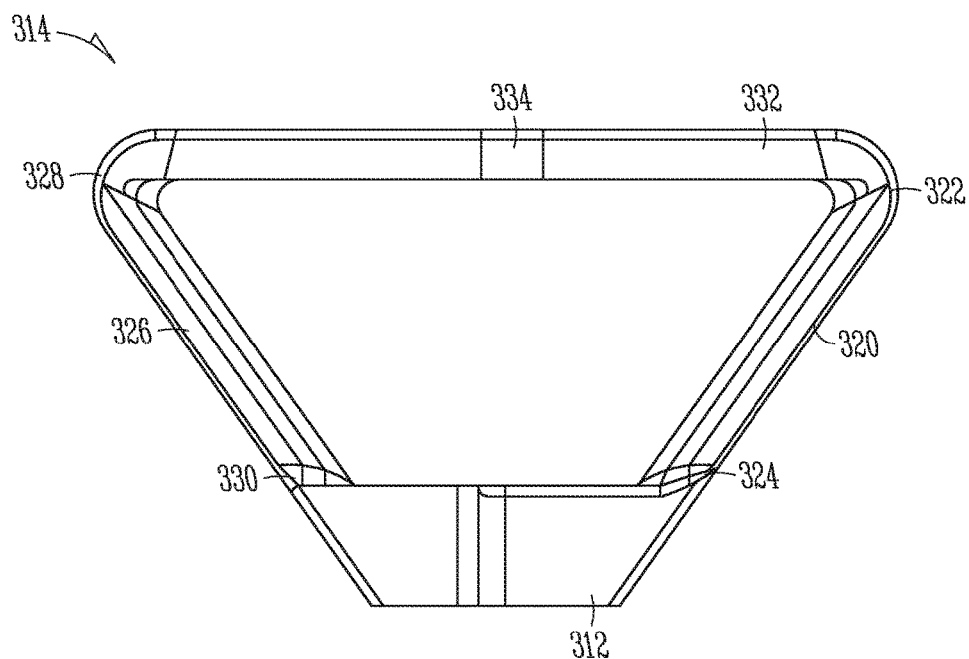
FIG. 26C is an end view of the first arm and the first hook pair of FIG. 26A.

FIG. 26C is an end view of the first arm 312 depicting the first hook pair 314 having a first hook 320 having a top 322 and a base 324 engaged to an arm 312, a second hook 326 having a top 328 and a base 330 engaged to the arm 312, and a third portion 332 that connects the first and second hooks 320, 326. As seen in the example of FIG. 26C, the third portion 332 does not have a bend in the vertical direction.

Figure 26D:
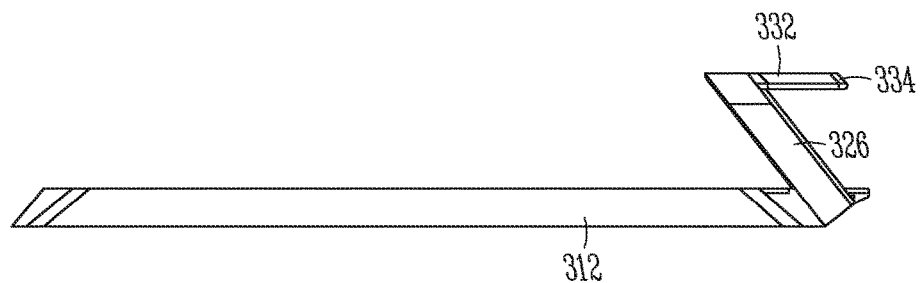
FIG. 26D is a side view of the first arm and the first hook of FIG. 6A.

FIG. 26D is a side view of the first arm 312 depicting the second hook 326 extending angularly toward the housing body 336 (shown in FIG. 26A). The first hook 320, which is hidden in this view, can also extend angularly toward the housing body.

Figure 27A:
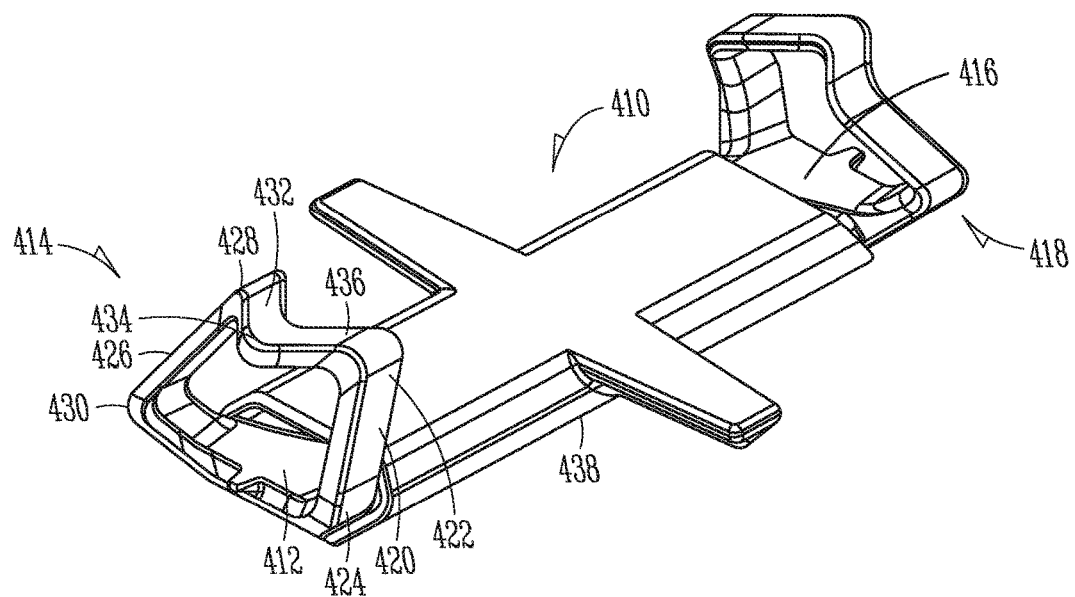
FIG. 27A is a perspective front view of another example hook configuration and housing assembly that can be used to secure a portable electronic device.

FIG. 27A is a perspective front view of another example hook configuration and housing assembly that can be used to secure a portable electronic device. The housing assembly 410 can include a first arm 412 having a first hook pair 414 and a second arm 416 having a second hook pair 418. The first hook pair 414 of FIG. 27A can include a first hook 420 having a top 422 and a base 424 engaged to an arm 412, a second hook 426 having a top 428 and a base 430 engaged to the arm 412, and a third portion 432 that connects the first and second hooks. As seen in FIG. 27A, the third portion 432 can include two bends or jogs 434, 436. The first bend 436 can extend away from the center of the housing body 438 so that the hook pair 414 does not interfere with the viewable portion of the device. The second hook pair 418 is similar to the first hook pair and for brevity will not be described.

Figure 27B:
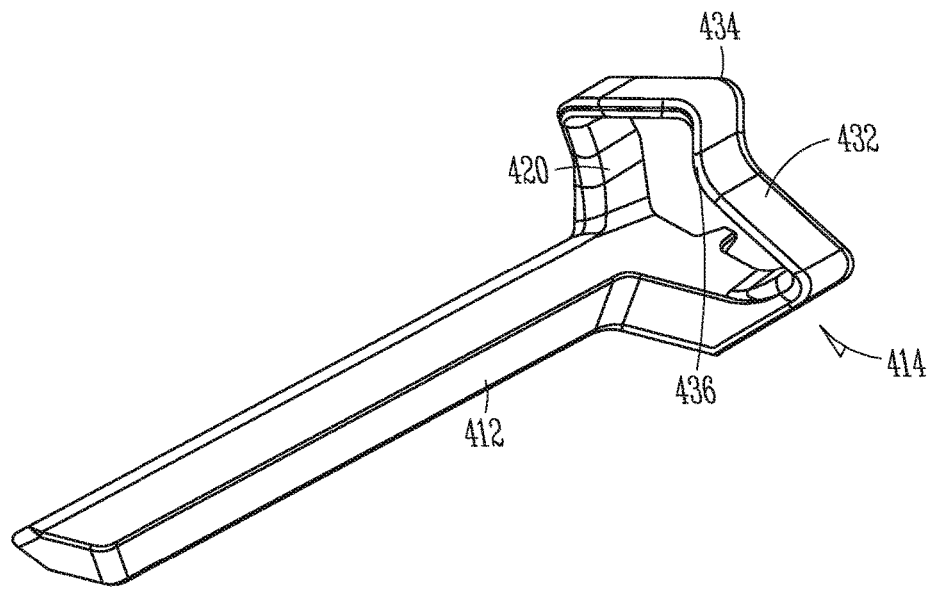
FIG. 27B is front perspective view of the second arm and the second hook pair of FIG. 27A.

FIG. 27B is front perspective view of the first arm 412 and the first hook pair 414.

Figure 27C:
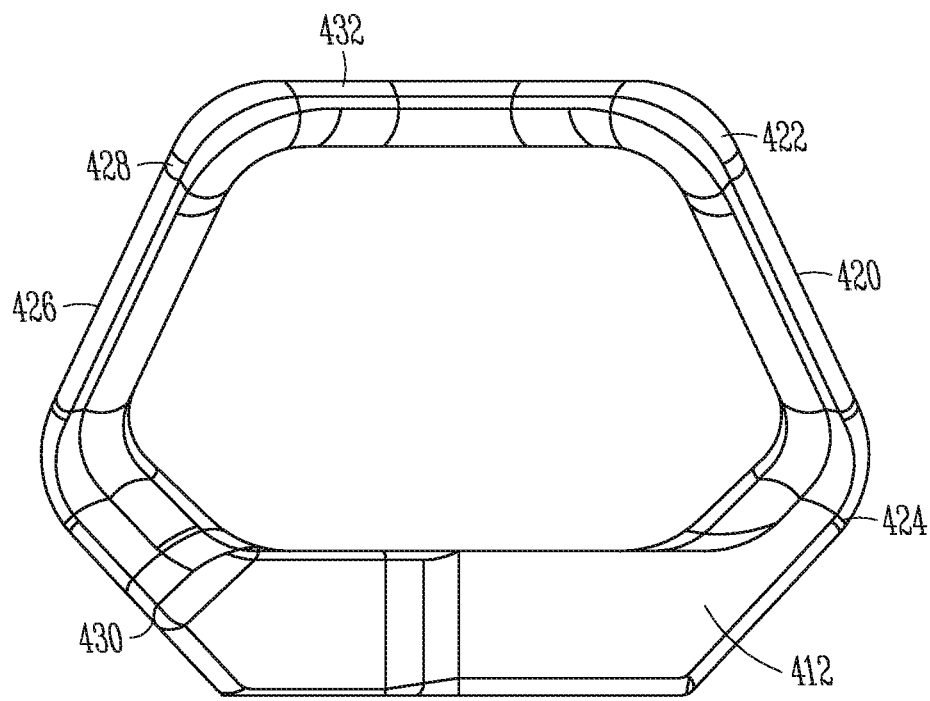
FIG. 27C is an end view of the first arm depicting the first hook pair of FIG. 27A.

FIG. 27C is an end view of the first arm 412 depicting the first hook pair 414 having a first hook 420 having a top 422 and a base 424 engaged to an arm, a second hook 426 having a top 428 and a base 430 engaged to the arm 412, and a third portion 432 that connects the first and second hooks 420, 426. As seen in the example of FIG. 26C, the third portion 432 does not have a bend in the vertical direction.

Figure 27D:
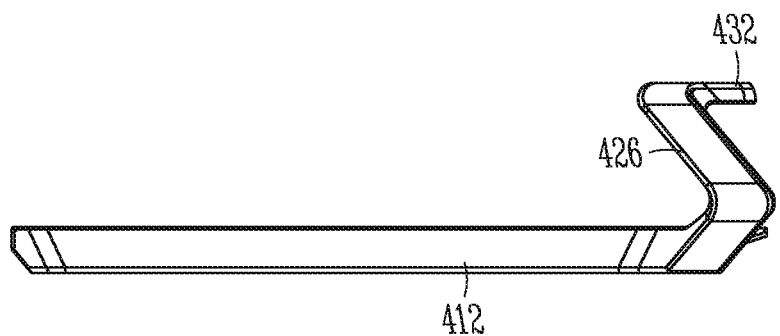
FIG. 27D is a side view of the first arm depicting the first hook of FIG. 27A.

FIG. 27D is a side view of the first arm 412 depicting the second hook 426 extending angularly toward the housing body 438 (shown in FIG. 27A). The first hook 420, which is hidden in this view, can also extend angularly toward the housing body.

Figure 28:
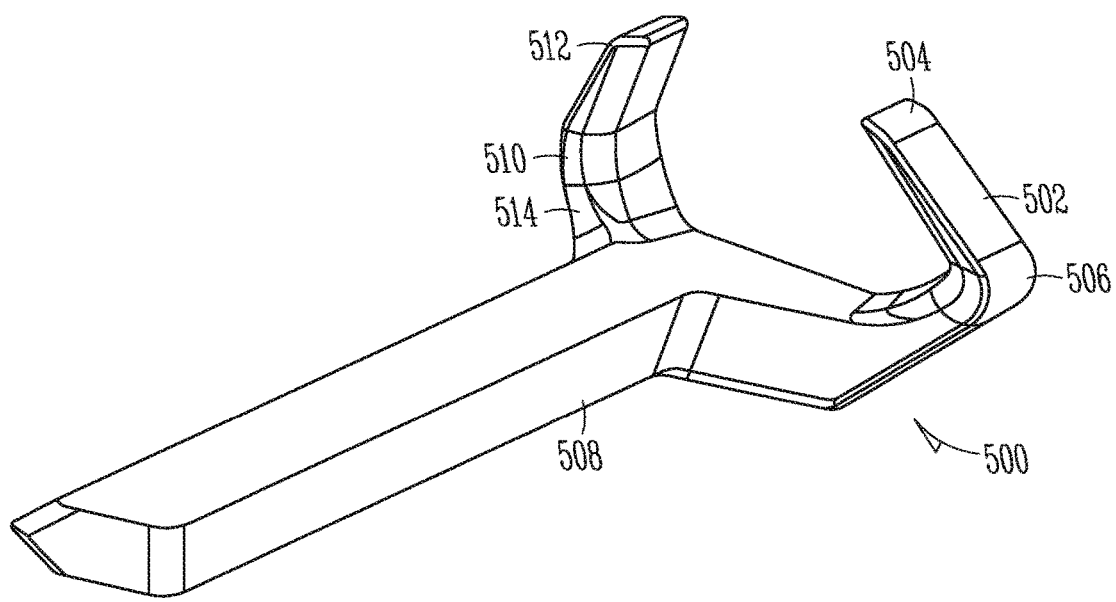
FIG. 28 is a perspective view of another example of a hook pair that can be used to hold a portable electronic device.

FIG. 28 is a perspective view of another example of a hook pair 500 that can be used to hold a portable electronic device. The hook pair 500 of FIG. 28 can include a first hook 502 having a top 504 and a base 506 engaged to an arm 508, a second hook 510 having a top 512 and a base 514 engaged to the arm 508. In the example configuration of FIG. 28, the tops 504, 512 are not connected. In addition, in some examples, the hooks 502, 510 do not extend either toward or away from a housing body (not depicted).

Any of the above hook pair configurations can be interchanged and included with the any of the above-described housing assembly configurations. As an example, the hook pairs shown in FIG. 27A, which are shown with a housing body having extended portions (or "wings"), can form part of a housing assembly having a housing body without extended portions, such as shown in FIG. 26A.

Figure 29:
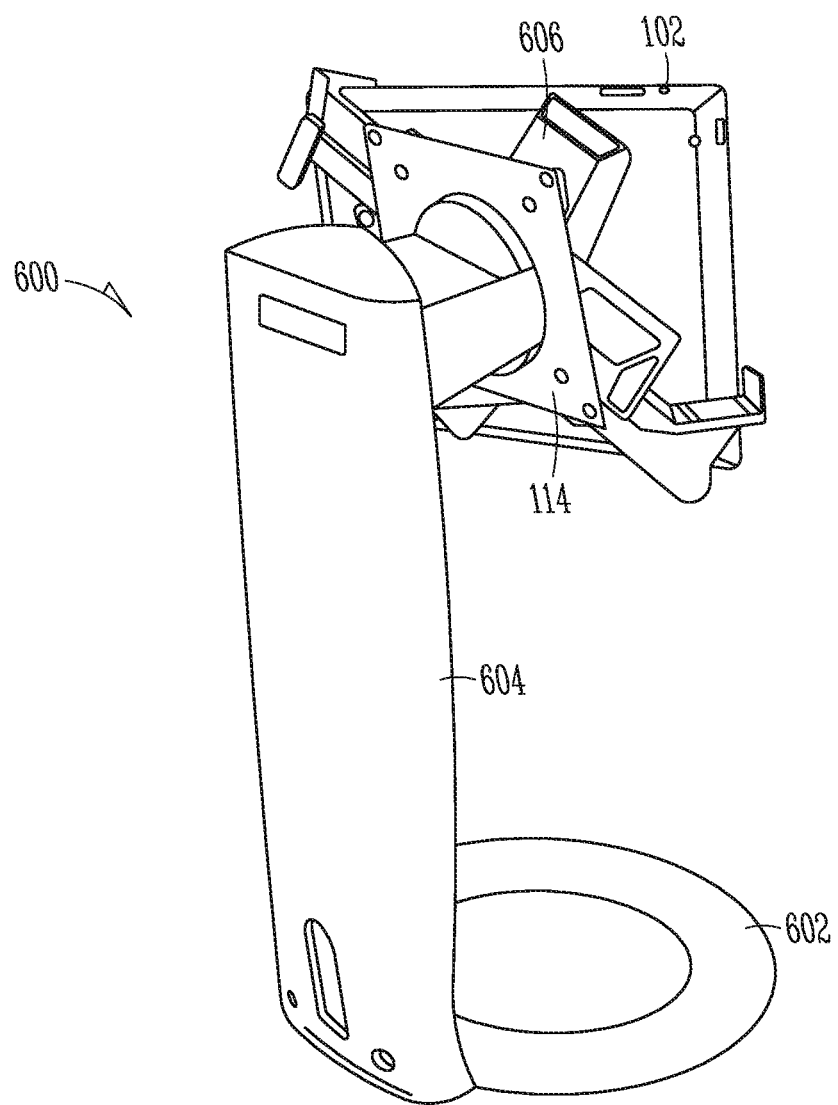
FIG. 29 is a rear perspective view of another example of a system configured to hold a portable electronic device, in accordance with various techniques of this disclosure.
Figure 30:
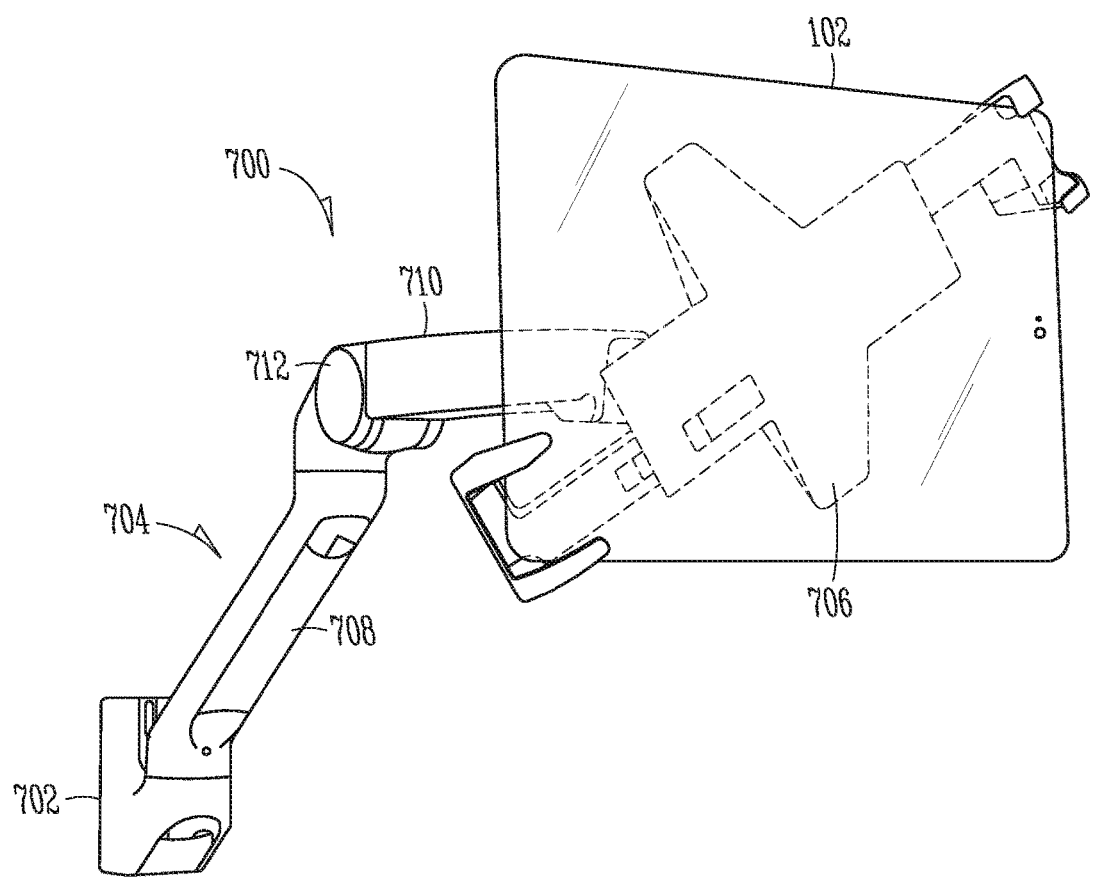
FIG. 30 is a front perspective view of another example of a system configured to hold a portable electronic device, in accordance with various techniques of this disclosure.

As mentioned above, the designs described in this disclosure allow easy attachment of a portable electronic device, e.g., tablets, to a mounting system, including a desk stand, a desk clamp arm, wall mount, and the like, such as shown in FIGS. 29 and 30, for example.

FIG. 29 is a rear perspective view of another example of a system configured to hold a portable electronic device 102, in accordance with various techniques of this disclosure. FIG. 29 depicts a desk stand mounting system 600 that includes a base 602, a riser 604, and a mounting bracket 114 configured to couple to a housing assembly 606. The housing assembly 606 can include any of the various housing assemblies and housing assembly components and features described above including, for example, the housing assembly 110 shown in FIGS. 3 and 4. The base 602 can be configured to rest on a support or work surface, e.g., a desktop. In some examples, the base 602 can be ring-shaped as shown in FIG. 29. In other examples, the base 602 can be square, rectangular, etc.

FIG. 30 is a front perspective view of another example of a system configured to hold a portable electronic device, in accordance with various techniques of this disclosure. FIG. 30 depicts a direct wall mounting system 700 configured to hold a device 102 (transparent in FIG. 30) that includes a wall mounting bracket 702, a support arm 704, and amounting bracket (not depicted) configured to couple to a housing assembly 706. The housing assembly 706 can include any of the various housing assemblies and housing assembly components and features described above including, for example, the housing assembly 110 shown in FIGS. 3 and 4. The support arm 704 can include a first portion 708 and a second portion 710 connected using a hinge 712.

As described above, the housing assemblies of this disclosure can include hooks that are configured to receive corners of a portable electronic device. Receiving the corners the device can aid in securing the device against theft. However, in some examples, a user may not be concerned with theft, e.g., in a home office. As such, the housing assemblies of this disclosure can be also used to receive the edges of an electronic device, as shown in FIGS. 31 and 32.

Figure 31:
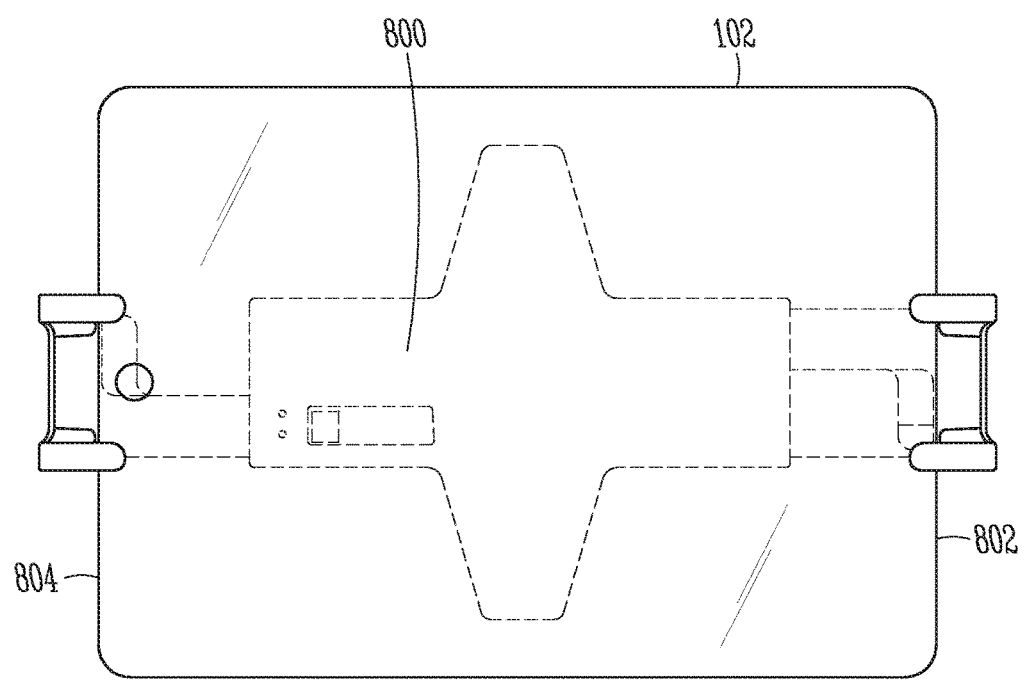
FIG. 31 is a front view of a housing assembly configured to receive the edges of a device such that the device is in a landscape or generally horizontal viewing configuration.

FIG. 31 is a front view of a housing assembly 800 configured to receive the top and bottom edges 802, 804 of a device 102 (transparent) such that the device is in a landscape or generally horizontal viewing configuration. The housing assembly 800 can include any of the various housing assemblies and housing assembly components and features described above including, for example, the housing assembly 110 shown in FIGS. 3 and 4. In some example configurations, the housing assembly 800 does not include a lock.

Figure 32:
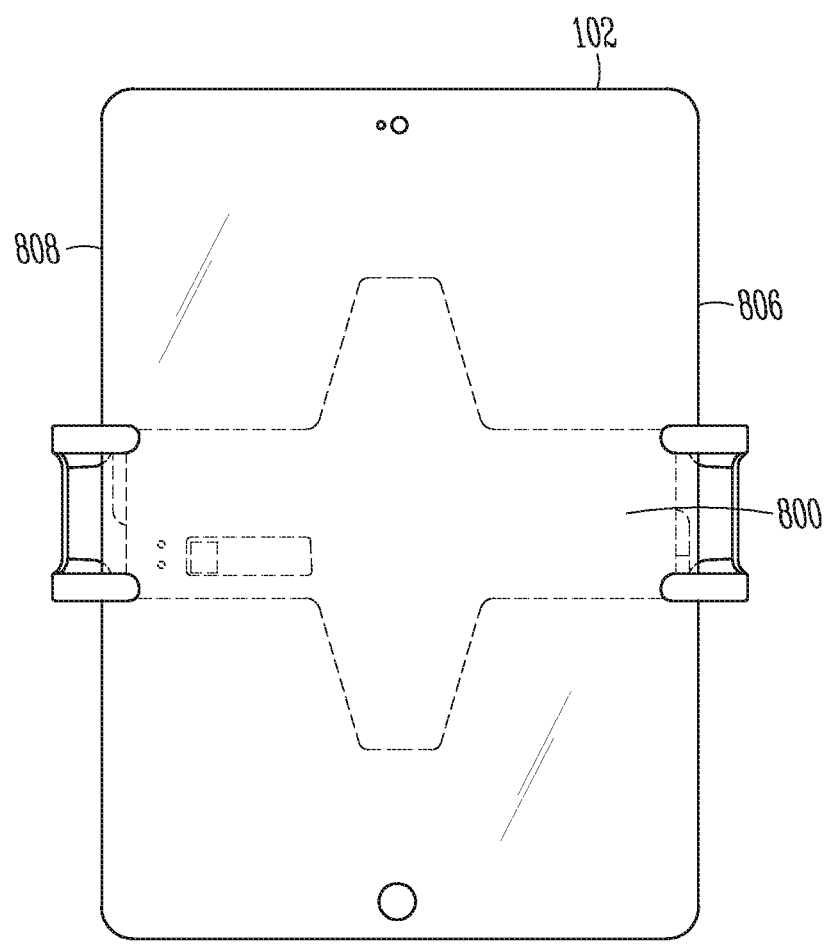
FIG. 32 is a front view of a housing assembly configured to receive the edges of a device such that the device is in a portrait or generally vertical viewing configuration.

FIG. 32 is a front view of the housing assembly 800 configured to receive the side edges 806, 808 of a device 102 (transparent) such that the device is in a portrait or generally vertical viewing configuration. The housing assembly 800 can include any of the various housing assemblies and housing assembly components and features described above including, for example, the housing assembly shown in FIGS. 3 and 4. In some example configurations, the housing assembly 800 does not include a lock.

ADDITIONAL NOTES AND EXAMPLES

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment.

The invention claimed is:

1. An apparatus configured to hold a portable electronic device, the apparatus comprising:
   a housing assembly including:
      a housing body;
      a first arm formed as a single component configured to extend from a first end of the housing body and including:
      a first hook and a second hook extending from a first end region of the first arm, the first hook having a top and a base and the second hook having a top and a base, the base of the first hook and the base of the second hook being engaged to the first end region of the first arm, a portion of the first hook and a portion of the second hook angularly extending toward the housing body, the first hook and the second hook forming a first hook pair configured to receive a first portion of the portable electronic device;
      wherein the first hook includes at least two faces defining a first inner rounded edge, the first inner rounded edge including a first contacting surface configured to contact the portable device;
      wherein the second hook includes at least two faces defining a second inner rounded edge, the second inner rounded edge opposing the first inner rounded edge, and the second inner rounded edge including a second contacting surface configured to contact the portable device opposite the first contacting surface; and
   a second arm formed as a single component configured to extend from a second end of the housing body and including:
      a third hook and a fourth hook extending from a first end region of the second arm, the third hook having a base and the fourth hook having a base, the base of the third hook and the base of the fourth hook being engaged to the first end region of the second arm, a portion of the third hook and a portion of the fourth hook angularly extending toward the housing body, the third hook and the fourth hook forming a second hook pair configured to receive a second portion of the portable electronic device.

2. The apparatus of claim 1 wherein the housing defines a first chamber and a second chamber, the first chamber separated from the second chamber by a divider, the first chamber configured to receive at least a portion of the first arm, and the second chamber configured to receive at least a portion of the second arm.

3. An apparatus configured to hold a portable electronic device, the apparatus comprising:
   a housing assembly including:
      a housing body;
      a first arm configured to extend from a first end of the housing body;
      a first hook and a second hook engaged to and extending from a first end region of the first arm, the first hook having a top and a base and the second hook having a top and a base, the base of the first hook and the base of the second hook being engaged to the first end region of the first arm, a portion of the first hook and a portion of the second hook angularly extending toward the housing body, the first hook and the second hook forming a first hook pair configured to receive a first portion of the portable electronic device;
      a second arm configured to extend from a second end of the housing body; and
      a third hook and a fourth hook engaged to and extending from a first end region of the second arm, the third hook having a base and the fourth hook having a base, the base of the third hook and the base of the fourth hook being engaged to the first end region of the second arm, a portion of the third hook and a portion of the fourth hook angularly extending toward the housing body, the third hook and the fourth hook forming a second hook pair configured to receive a second portion of the portable electronic device, wherein the housing body defines a first chamber and a second chamber, the first chamber separated from the second chamber by a divider, the first chamber configured to receive at least a portion of the first arm, and the second chamber configured to receive at least a portion of the second arm, wherein the divider defines a plurality of divider teeth, the housing assembly comprising a lock rod including:

a lock rod body having a first end and a second end;

a key lock positioned at the first end of the lock rod body and configured to receive a key; and a plurality of lock rod teeth positioned at the second end of the lock rod body, the plurality of lock rod teeth configured to engage the plurality of divider teeth and prevent movement of the first arm when the lock rod body is turned using the key.

4. The apparatus of claim 3 wherein the lock rod body extends through a portion of the first arm.

5. The apparatus of any claim 1, wherein the second arm includes a cover, the cover defining a plurality of notches, the housing assembly including a housing cover and a lock latch rotatingly coupled to the housing cover, the lock latch defining at least one tooth, the lock latch configured to engage one of the plurality of notches and lock the second arm in a position relative to the housing body.

6. The apparatus of claim 5, further comprising a lock spring attached to an end of the lock latch, the lock spring configured to bias the lock latch toward the plurality of notches.

7. The apparatus of claim 1, comprising:

a first boss attached to the housing body;

a second boss attached to the first arm; and a spring having a first end engaged to the first boss and a second end engaged to the second boss, the spring configured to bias the first arm towards a closed position.

8. The apparatus of claim 1, wherein the portion of the first hook and the portion of the second hook angularly extending toward the housing body are straight, and wherein the portion of the third hook and the portion of the fourth hook angularly extending toward the housing body are straight.

9. The apparatus of claim 1, wherein the first hook and the second hook are not connected to one another, and wherein the third hook and the fourth hook are not connected to one another.

10. The apparatus of claim 1, wherein the first portion is a first corner and wherein the second portion is a second corner.

11. The apparatus of claim 1, wherein the first portion is a first edge and wherein the second portion is a second edge.

12. A system configured to hold a portable electronic device, the system comprising:

a mounting bracket;

a housing assembly configured to couple to the mounting bracket and hold a portable electronic device, the housing assembly including:

a housing body;

a first arm formed as a single component configured to extend from a first end of the housing body and including:

a first hook and a second hook extending from a first end region of the first arm, the first hook having a top and a base and the second hook having a top and a base, the base of the first hook and the base of the second hook being engaged to the first end region of the first arm, a portion of the first hook and a portion of the second hook angularly extending toward the housing body, the first hook and the second hook forming a first hook pair configured to receive a first portion of the portable electronic device;

wherein the first hook includes at least two faces defining a first inner rounded edge, the first inner rounded edge including a first contacting surface configured to contact the portable device;

wherein the second hook includes at least two faces defining a second inner rounded edge, the second inner rounded edge opposing the first inner rounded edge, and the second inner rounded edge including a second contacting surface configured to contact the portable device opposite the first contacting surface; and a second arm formed as a single component configured to extend from a second end of the housing body and including:

a third hook and a fourth hook extending from a first end region of the second arm, the third hook having a base and the fourth hook having a base, the base of the third hook and the base of the fourth hook being engaged to the first end region of the second arm, a portion of the third hook and a portion of the fourth hook angularly extending toward the housing body, the third hook and the fourth hook forming a second hook pair configured to receive a second portion of the portable electronic device.

13. The system of claim 12, wherein the housing defines a first chamber and a second chamber, the first chamber separated from the second chamber by a divider, the first chamber configured to receive at least a portion of the first arm, and the second chamber configured to receive at least a portion of the second arm.

14. A system configured to hold a portable electronic device, the system comprising:

a mounting bracket;

a housing assembly configured to couple to the mounting bracket and hold a portable electronic device, the housing assembly including:

a housing body;

a first arm configured to extend from a first end of the housing body;

a first hook and a second hook engaged to and extending from a first end region of the first arm, the first hook having a top and a base and the second hook having a top and a base, the base of the first hook and the base of the second hook being engaged to the first end region of the first arm, a portion of the first hook and a portion of the second hook angularly extending toward the housing body, the first hook and the second hook forming a first hook pair configured to receive a first portion of the portable electronic device;

a second arm configured to extend from a second end of the housing body; and a third hook and a fourth hook engaged to and extending from a first end region of the second arm, the third hook having a base and the fourth hook having a base, the base of the third hook and the base of the fourth hook being engaged to the first end region of the second arm, a portion of the third hook and a portion of the fourth hook angularly extending toward the housing body, the third hook and the fourth hook forming a second hook pair configured to receive a second portion of the portable electronic device, wherein the housing body defines a first chamber and a second chamber, the first chamber separated from the second chamber by a divider, the first chamber configured to receive at least a portion of the first arm, and the second chamber configured to receive at least a portion of the second arm, wherein the divider defines a plurality of divider teeth, the housing assembly comprising a lock rod including:

a lock rod body having a first end and a second end and extending through a portion of the first arm;

a key lock positioned at the first end of the lock rod body and configured to receive a key; and a plurality of lock rod teeth positioned at the second end of the lock rod body, the plurality of lock rod teeth configured to engage the plurality of divider teeth when the lock rod body is turned using the key.

15. The system of claim 14, wherein the second arm includes a cover, the cover defining a plurality of notches, the housing assembly including a housing cover and a lock latch rotatingly coupled to the housing cover, the lock latch defining at least one tooth, the lock latch configured to engage one of the plurality of notches and lock the second arm in a position relative to the housing body.

16. The system of claim 15, further comprising a lock spring attached to an end of the lock latch, the lock spring configured to bias the lock latch toward the plurality of notches.

17. The system of claim 14, comprising:

a first boss attached to the housing body;

a second boss attached to the first arm; and a spring having a first end engaged to the first boss and a second end engaged to the second boss, the spring configured to bias the first arm towards a closed position.

18. The system of claim 14, comprising:

a support arm configured to be engaged to a support surface, an end of the support arm configured to couple to the mounting bracket.

19. The system of claim 18, wherein the support surface is a wall.

20. The system of claim 18, wherein the support surface is a generally horizontal work surface, the system comprising:

a clamp configured to attach to the work surface; and a riser configured to extend upwardly from the clamp, the support arm configured to slidingly couple to the riser.

21. The apparatus of claim 1, wherein the first hook and the third hook extend toward each other along a first plane, wherein the second hook and the fourth hook extend toward each other along a second plane, and wherein the first plane and the second plane are substantially parallel.

22. The system of claim 12, wherein the first hook and the third hook extend toward each other along a first plane, wherein the second hook and the fourth hook extend toward each other along a second plane, and wherein the first plane and the second plane are substantially parallel.

* * * * *

UNITED STATES PATENT AND TRADEMARK OFFICE
CERTIFICATE OF CORRECTION

PATENT NO. : 9,890,899 B2  
APPLICATION NO. : 15/165815  
DATED : February 13, 2018  
INVENTOR(S) : Theis et al.

Page 1 of 2

It is certified that error appears in the above-identified patent and that said Letters Patent is hereby corrected as shown below:

On the Title Page

In Column 2, item (56) under "Other Publications", Line 1, delete "60" and insert --360-- therefor In the Specification In Column 1, Line 13, delete "HELD" and insert --FIELD-- therefor In Column 2, Line 44, before "Example", insert --In--

In Column 4, Line 1, before "Example", insert --In--

In Column 5, Line 30, delete "FIG. 6A." and insert --FIG. 26A.-- therefor

In Column 7, Line 29, delete "2A" and insert --112A-- therefor

In Column 7, Line 30, delete "2B" and insert --112B-- therefor

In Column 7, Line 35, delete "abase" and insert --a base-- therefor

In Column 8, Line 24, delete "116" and insert --110-- therefor

In Column 11, Line 32, delete "21" and insert --212-- therefor

In Column 12, Line 6, delete "18" and insert --218-- therefor

In Column 12, Line 21, delete "arm" and insert --arms-- therefor

Signed and Sealed this  
Second Day of July, 2019

Andrei Iancu  
*Director of the United States Patent and Trademark Office*

CERTIFICATE OF CORRECTION (continued)
U.S. Pat. No. 9,890,899 B2

In Column 12, Line 64, delete "286" and insert --294-- therefor

In Column 14, Lines 45-46, delete "amounting" and insert --a mounting-- therefor